(12) United States Patent
Michaels et al.

(10) Patent No.: US 8,406,352 B2
(45) Date of Patent: Mar. 26, 2013

(54) SYMBOL ESTIMATION FOR CHAOTIC SPREAD SPECTRUM SIGNAL

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 536 days.

(21) Appl. No.: 12/496,146

(22) Filed: Jul. 1, 2009

(65) Prior Publication Data

US 2011/0002362 A1    Jan. 6, 2011

(51) Int. Cl.
H03D 1/00 (2006.01)
H04L 27/06 (2006.01)

(52) U.S. Cl. ...................................... 375/343

(58) Field of Classification Search .................. 375/130, 375/138, 140, 141, 146, 147, 148, 149, 285, 375/296, 343, 346
See application file for complete search history.

(56) References Cited

U.S. PATENT DOCUMENTS

| | | |
|---|---|---|
| 3,564,223 A | 2/1971 | Harris et al. |
| 4,095,778 A | 6/1978 | Wing |
| 4,646,326 A | 2/1987 | Backof, Jr. et al. |
| 4,703,507 A | 10/1987 | Holden |
| 4,893,316 A | 1/1990 | Janc et al. |
| 5,007,087 A | 4/1991 | Bernstein et al. |
| 5,048,086 A | 9/1991 | Bianco et al. |
| 5,077,793 A | 12/1991 | Falk et al. |
| 5,210,770 A | 5/1993 | Rice |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,596,600 A | 1/1997 | Dimos et al. |
| 5,598,476 A | 1/1997 | LaBarre et al. |
| 5,646,997 A | 7/1997 | Barton |
| 5,677,927 A | 10/1997 | Fullerton et al. |
| 5,680,462 A | 10/1997 | Miller et al. |

(Continued)

FOREIGN PATENT DOCUMENTS

| | | |
|---|---|---|
| EP | 0 849 664 A2 | 6/1998 |
| EP | 0 949 563 | 10/1999 |

(Continued)

OTHER PUBLICATIONS

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

(Continued)

*Primary Examiner* — David C. Payne
*Assistant Examiner* — Syed Haider
(74) *Attorney, Agent, or Firm* — Fox Rothschild, LLP; Robert J. Sacco

(57) ABSTRACT

A communications system includes RF hardware (104) configured for receiving an input data signal includes a modulated carrier encoded with information symbols and modulated using a sequence of discrete time chaotic samples. The system also includes a chaotic sequence generator (340) configured for generating the sequence of discrete-time chaotic samples and a correlator (328). The correlator is configured for synchronizing the input data signal with the sequence of discrete-time chaotic samples and obtaining normalization factor values for each of the information symbols based on comparing a received symbol energy for the information symbols and a symbol energy of the discrete-time chaotic samples associated with the duration of transmission of the information symbols.

18 Claims, 7 Drawing Sheets

U.S. PATENT DOCUMENTS

| | | | |
|---|---|---|---|
| 5,757,923 A | 5/1998 | Koopman, Jr. | |
| 5,811,998 A | 9/1998 | Lundberg et al. | |
| 5,852,630 A | 12/1998 | Langberg et al. | |
| 5,900,835 A | 5/1999 | Stein | |
| 5,923,760 A | 7/1999 | Abarbanel et al. | |
| 5,924,980 A | 7/1999 | Coetzee | |
| 5,937,000 A | 8/1999 | Lee et al. | |
| 5,963,584 A | 10/1999 | Boulanger et al. | |
| 6,014,446 A | 1/2000 | Finkelstein | |
| 6,023,612 A | 2/2000 | Harris et al. | |
| 6,038,317 A | 3/2000 | Magliveras et al. | |
| 6,078,611 A | 6/2000 | La Rosa et al. | |
| 6,141,786 A | 10/2000 | Cox et al. | |
| 6,212,239 B1 | 4/2001 | Hayes | |
| 6,304,216 B1 | 10/2001 | Gronemeyer | |
| 6,304,556 B1 | 10/2001 | Haas | |
| 6,310,906 B1 | 10/2001 | Abarbanel et al. | |
| 6,314,187 B1 | 11/2001 | Menkhoff et al. | |
| 6,331,974 B1* | 12/2001 | Yang et al. ................ | 370/342 |
| 6,377,782 B1 | 4/2002 | Bishop et al. | |
| 6,473,448 B1 | 10/2002 | Shono et al. | |
| 6,570,909 B1 | 5/2003 | Kansakoski et al. | |
| 6,614,914 B1 | 9/2003 | Rhoads et al. | |
| 6,665,692 B1 | 12/2003 | Nieminen | |
| 6,732,127 B2 | 5/2004 | Karp | |
| 6,744,893 B1 | 6/2004 | Fleming-Dahl | |
| 6,754,251 B1 | 6/2004 | Sriram et al. | |
| 6,766,345 B2 | 7/2004 | Stein et al. | |
| 6,842,479 B2 | 1/2005 | Bottomley | |
| 6,842,745 B2 | 1/2005 | Occhipinti et al. | |
| 6,864,827 B1 | 3/2005 | Tise et al. | |
| 6,865,218 B1 | 3/2005 | Sourour | |
| 6,888,813 B1 | 5/2005 | Kishi | |
| 6,901,104 B1 | 5/2005 | Du et al. | |
| 6,937,568 B1 | 8/2005 | Nicholl et al. | |
| 6,980,656 B1 | 12/2005 | Hinton, Sr. et al. | |
| 6,980,657 B1 | 12/2005 | Hinton, Sr. et al. | |
| 6,986,054 B2 | 1/2006 | Kaminaga et al. | |
| 6,993,016 B1 | 1/2006 | Liva et al. | |
| 6,999,445 B1 | 2/2006 | Dmitriev et al. | |
| 7,023,323 B1 | 4/2006 | Nysen | |
| 7,027,598 B1 | 4/2006 | Stojancic et al. | |
| 7,035,220 B1 | 4/2006 | Simcoe | |
| 7,069,492 B2 | 6/2006 | Piret et al. | |
| 7,076,065 B2 | 7/2006 | Sherman et al. | |
| 7,078,981 B2 | 7/2006 | Farag | |
| 7,079,651 B2 | 7/2006 | Den Boer et al. | |
| 7,095,778 B2 | 8/2006 | Okubo et al. | |
| 7,133,522 B2 | 11/2006 | Lambert | |
| 7,170,997 B2 | 1/2007 | Petersen et al. | |
| 7,190,681 B1 | 3/2007 | Wu | |
| 7,200,225 B1 | 4/2007 | Schroeppel | |
| 7,233,969 B2 | 6/2007 | Rawlins et al. | |
| 7,233,970 B2 | 6/2007 | North et al. | |
| 7,245,723 B2 | 7/2007 | Hinton, Sr. et al. | |
| 7,269,198 B1 | 9/2007 | Elliott et al. | |
| 7,269,258 B2 | 9/2007 | Ishihara et al. | |
| 7,272,168 B2 | 9/2007 | Akopian | |
| 7,277,540 B1 | 10/2007 | Shiba et al. | |
| 7,286,802 B2 | 10/2007 | Beyme et al. | |
| 7,310,309 B1 | 12/2007 | Xu | |
| 7,349,381 B1* | 3/2008 | Clark et al. ................ | 370/350 |
| 7,423,972 B2 | 9/2008 | Shaham et al. | |
| 7,529,292 B2 | 5/2009 | Bultan et al. | |
| 7,643,537 B1 | 1/2010 | Giallorenzi et al. | |
| 7,725,114 B2 | 5/2010 | Feher | |
| 7,779,060 B2 | 8/2010 | Kocarev et al. | |
| 7,830,214 B2 | 11/2010 | Han et al. | |
| 7,853,014 B2 | 12/2010 | Blakley et al. | |
| 7,929,498 B2 | 4/2011 | Ozluturk et al. | |
| 7,949,032 B1 | 5/2011 | Frost | |
| 7,974,146 B2 | 7/2011 | Barkley | |
| 2001/0017883 A1 | 8/2001 | Tiirola et al. | |
| 2002/0012403 A1 | 1/2002 | McGowan et al. | |
| 2002/0034191 A1 | 3/2002 | Shattil | |
| 2002/0034215 A1 | 3/2002 | Inoue et al. | |
| 2002/0041623 A1 | 4/2002 | Umeno | |
| 2002/0054682 A1 | 5/2002 | Di Bernardo et al. | |
| 2002/0094797 A1 | 7/2002 | Marshall et al. | |
| 2002/0099746 A1 | 7/2002 | Tie et al. | |
| 2002/0110182 A1* | 8/2002 | Kawai ........................ | 375/147 |
| 2002/0115461 A1 | 8/2002 | Shiraki et al. | |
| 2002/0122465 A1 | 9/2002 | Agee et al. | |
| 2002/0128007 A1 | 9/2002 | Miyatani | |
| 2002/0172291 A1 | 11/2002 | Maggio et al. | |
| 2002/0174152 A1 | 11/2002 | Terasawa et al. | |
| 2002/0176511 A1* | 11/2002 | Fullerton et al. ............. | 375/285 |
| 2002/0186750 A1 | 12/2002 | Callaway et al. | |
| 2003/0007639 A1 | 1/2003 | Lambert | |
| 2003/0016691 A1 | 1/2003 | Cho | |
| 2003/0044004 A1 | 3/2003 | Blakley et al. | |
| 2003/0156603 A1* | 8/2003 | Rakib et al. ................ | 370/485 |
| 2003/0182246 A1 | 9/2003 | Johnson et al. | |
| 2003/0198184 A1 | 10/2003 | Huang et al. | |
| 2004/0001534 A1 | 1/2004 | Yang | |
| 2004/0001556 A1 | 1/2004 | Harrison et al. | |
| 2004/0059767 A1 | 3/2004 | Liardet | |
| 2004/0092291 A1 | 5/2004 | Legnain et al. | |
| 2004/0100588 A1 | 5/2004 | Hartson et al. | |
| 2004/0146095 A1 | 7/2004 | Umeno et al. | |
| 2004/0156427 A1 | 8/2004 | Gilhousen et al. | |
| 2004/0161022 A1 | 8/2004 | Glazko et al. | |
| 2004/0165650 A1 | 8/2004 | Miyazaki et al. | |
| 2004/0165681 A1 | 8/2004 | Mohan | |
| 2004/0184416 A1 | 9/2004 | Woo | |
| 2004/0196212 A1 | 10/2004 | Shimizu | |
| 2004/0196933 A1 | 10/2004 | Shan et al. | |
| 2005/0004748 A1 | 1/2005 | Pinto et al. | |
| 2005/0021308 A1 | 1/2005 | Tse et al. | |
| 2005/0031120 A1 | 2/2005 | Samid | |
| 2005/0050121 A1 | 3/2005 | Klein et al. | |
| 2005/0075995 A1 | 4/2005 | Stewart et al. | |
| 2005/0089169 A1 | 4/2005 | Kim et al. | |
| 2005/0129096 A1 | 6/2005 | Zhengdi et al. | |
| 2005/0207574 A1 | 9/2005 | Pitz et al. | |
| 2005/0249271 A1 | 11/2005 | Lau et al. | |
| 2005/0254587 A1 | 11/2005 | Kim et al. | |
| 2005/0259723 A1 | 11/2005 | Blanchard | |
| 2005/0265430 A1* | 12/2005 | Ozluturk et al. ............. | 375/145 |
| 2005/0274807 A1 | 12/2005 | Barrus et al. | |
| 2006/0034378 A1 | 2/2006 | Lindskog et al. | |
| 2006/0072754 A1 | 4/2006 | Hinton et al. | |
| 2006/0088081 A1 | 4/2006 | Withington et al. | |
| 2006/0093136 A1 | 5/2006 | Zhang et al. | |
| 2006/0123325 A1 | 6/2006 | Wilson et al. | |
| 2006/0209926 A1 | 9/2006 | Umeno et al. | |
| 2006/0209932 A1 | 9/2006 | Khandekar et al. | |
| 2006/0239334 A1 | 10/2006 | Kwon et al. | |
| 2006/0251250 A1* | 11/2006 | Ruggiero et al. ............. | 380/46 |
| 2006/0264183 A1 | 11/2006 | Chen et al. | |
| 2007/0098054 A1 | 5/2007 | Umeno | |
| 2007/0121945 A1 | 5/2007 | Han et al. | |
| 2007/0133495 A1 | 6/2007 | Lee et al. | |
| 2007/0149232 A1 | 6/2007 | Koslar | |
| 2007/0195860 A1 | 8/2007 | Yang et al. | |
| 2007/0201535 A1 | 8/2007 | Ahmed | |
| 2007/0217528 A1 | 9/2007 | Miyoshi et al. | |
| 2007/0230701 A1 | 10/2007 | Park et al. | |
| 2007/0253464 A1 | 11/2007 | Hori et al. | |
| 2007/0291833 A1 | 12/2007 | Shimanskiy | |
| 2008/0008320 A1* | 1/2008 | Hinton et al. ................ | 380/263 |
| 2008/0016431 A1 | 1/2008 | Lablans | |
| 2008/0019422 A1 | 1/2008 | Smith et al. | |
| 2008/0026706 A1 | 1/2008 | Shimizu et al. | |
| 2008/0075195 A1 | 3/2008 | Pajukoski et al. | |
| 2008/0080439 A1 | 4/2008 | Aziz et al. | |
| 2008/0084919 A1 | 4/2008 | Kleveland et al. | |
| 2008/0095215 A1 | 4/2008 | McDermott et al. | |
| 2008/0107268 A1 | 5/2008 | Rohde et al. | |
| 2008/0198832 A1 | 8/2008 | Chester | |
| 2008/0204306 A1 | 8/2008 | Shirakawa | |
| 2008/0263119 A1 | 10/2008 | Chester et al. | |
| 2008/0294707 A1 | 11/2008 | Suzuki et al. | |
| 2008/0294710 A1 | 11/2008 | Michaels | |
| 2008/0294956 A1 | 11/2008 | Chester et al. | |
| 2008/0304553 A1 | 12/2008 | Zhao et al. | |
| 2008/0304666 A1 | 12/2008 | Chester et al. | |

| | | | |
|---|---|---|---|
| 2008/0307022 | A1 | 12/2008 | Michaels et al. |
| 2008/0307024 | A1 | 12/2008 | Michaels et al. |
| 2009/0022212 | A1 | 1/2009 | Ito et al. |
| 2009/0034727 | A1 | 2/2009 | Chester et al. |
| 2009/0044080 | A1 | 2/2009 | Michaels et al. |
| 2009/0059882 | A1 | 3/2009 | Hwang et al. |
| 2009/0086848 | A1 | 4/2009 | Han et al. |
| 2009/0110197 | A1 | 4/2009 | Michaels |
| 2009/0122926 | A1 | 5/2009 | Azenkot et al. |
| 2009/0196420 | A1 | 8/2009 | Chester et al. |
| 2009/0202067 | A1 | 8/2009 | Michaels et al. |
| 2009/0245327 | A1 | 10/2009 | Michaels |
| 2009/0279688 | A1 | 11/2009 | Michaels et al. |
| 2009/0279690 | A1 | 11/2009 | Michaels et al. |
| 2009/0285395 | A1 | 11/2009 | Hu et al. |
| 2009/0296860 | A1 | 12/2009 | Chester et al. |
| 2009/0300088 | A1 | 12/2009 | Michaels et al. |
| 2009/0309984 | A1 | 12/2009 | Bourgain et al. |
| 2009/0310650 | A1 | 12/2009 | Chester et al. |
| 2009/0316679 | A1 | 12/2009 | Van Der Wateren |
| 2009/0323766 | A1 | 12/2009 | Wang et al. |
| 2009/0327387 | A1 | 12/2009 | Michaels et al. |
| 2010/0029225 | A1 | 2/2010 | Urushihara et al. |
| 2010/0030832 | A1 | 2/2010 | Mellott |
| 2010/0054225 | A1 | 3/2010 | Hadef et al. |
| 2010/0073210 | A1 | 3/2010 | Bardsley et al. |
| 2010/0111296 | A1 | 5/2010 | Brown et al. |
| 2010/0142593 | A1 | 6/2010 | Schmid |
| 2010/0254430 | A1* | 10/2010 | Lee et al. ............ 375/130 |
| 2010/0260276 | A1 | 10/2010 | Orlik et al. |
| 2011/0222393 | A1 | 9/2011 | Kwak et al. |

FOREIGN PATENT DOCUMENTS

| | | |
|---|---|---|
| EP | 2 000 900 A2 | 12/2008 |
| EP | 2 000 902 A2 | 12/2008 |
| GB | 1167272 A | 10/1969 |
| JP | 7140983 A | 6/1995 |
| JP | 2001255817 A | 9/2001 |
| JP | 2004279784 A | 10/2004 |
| JP | 2004343509 A | 12/2004 |
| JP | 2005017612 A | 1/2005 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Barile, Margherita, "Bijective," From MathWorld-A Wolfram Web Resource, created by Eric W. Weisstein. http://mathworld.wolfram.com/Bijective.html.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004, XPOO2558039.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D.E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Manikandan, et al, "A Novel Pulse Based Ultrawide Band System Using Chaotic Spreading Sequences" Communication Systems Software and Middleware, 2007. COMSWARE 2007. 2nd International Conference on, IEEE, PI, Jan. 1, 2007, pp. 1-5, XP031113946 ISBN: 978-1-4244-0613-5; p. 1, p. 5.

Morsche et al., "Signals and Systems," lecture notes, University of Eindhoven, The Netherlands (1999).

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Weisstein, Eric W., "Injection," From MathWorld-A Wolfram Web Resource. http://mathworld.wolfram.com/Injection.html.

Weisstein, Eric W. "Surjection," From MathWorld-A Wolfram Web Resource, http://mathworld.wolfram.com/Surjection.html.

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0/7803-6685-5.

Michaels, et al., U.S. Appl. No. 12/496,214, filed Jul. 1, 2009, entitled "Anti-Jam Communications Having Selectively Variable PAPR Including CAZAC Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".
Michaels, et al., U.S. Appl. No. 12/396,828, filed Jun. 3, 2009, entitled "Communications System Employing Orthogonal Chaotic Spreading Codes".
Michaels, et al., U.S. Appl. No. 12/496,170, filed Jul. 1, 2009, entitled "Permission Based Multiple Access Communications Systems".
Michaels, et al., U.S. Appl. No. 12/496,233, filed Jul. 1, 2009, entitled "Permission-Based Secure Multiple Access Communication Systems Rotations".
Micheals, at al., U.S. Appl. No. 12/507,512, filed Jul. 22, 2009, entitled "Permission-Based TDMA Chaotic Communication Systems".
Micheals, et al., U.S. Appl. No. 12/496,085, filed Jul. 1, 2009, entitled, "High-Speed Cryptographic System Using Chaotic Sequences".
Michaels, et al., U.S. Appl. No. 12/496,123, filed Jul. 1, 2009, entitled, "Rake Receiver for Spread Spectrum Chaotic Communications Systems".
Michaels, et al., U.S. Appl. No. 12/496,146, filed Jul. 1, 2009, entitled "Improved Symbol Estimation for Chaotic Spread Spectrum Signal".
Micheals, et al., U.S. Appl. No. 12/480,316, filed Jun. 8, 2009, entitled "Symbol Duration Dithering for Secured Chaotic Communications".
Michaels, et al., U.S. Appl. No. 12/496,183, filed Jun. 1, 2009, entitled "BIT Error Rate Reduction in Chaotic Communications".
Michaels, Alan, U.S. Appl. No. 12/248,131, filed Oct. 9, 2008, entitled "Ad-Hoc Network Acquisition Using Chaotic Sequence Spread Waveform".
Michaels, Alan, U.S. Appl. No. 12/201,021, filed Aug. 29, 2008, entitled, "Multi-Tier Ad-Hoc Network Communications".
Socek, D., et al., Short Paper: Enhanced 1-D Chaotic Key Based Algorithm for Image Encryption, Sep. 2005, IEEE.
Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.
Pirkin, Llya, Calculations in Galois Fields., C/C++ Users Journal; Oct. 2004, vol. 22 Issue 10, p. 14-18, 4p, 1 Color Photograph.
Popescu, Angel, A Galois Theory for the Field Extension K ((X))/K., Glasgow Mathematical Journal; Sep. 2010, vol. 52 Issue 3, p. 447-451, 5p.
Pirkin, Ilya, Calculations in Galois Fields., C/C++ Users Journal; Oct. 2004, vol. 22 Issue 10, p. 14-18, 4p, 1 Color Photograph.
Diaz-Toca, G.M. and Lombardi, H. , Dynamic Galois Theory., Journal of Symbolic Computation; Dec. 2010, vol. 45 Issue 12, p. 1316-1329, 14p.
Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.
International Search Report mailed Dec. 30, 2011, European Patent Application No. 11001222.6, in the name of Harris Corporation.
Aparicio; "Communications Systems Based on Chaos" May 2007. Universidad Rey Juan Carlos.
Bererber, S.M., et al., "Design of a CDMA System in FPGA Technology", Vehicular Technology Conference, 2007. VTC2007-Spring. IEEE 65$^{th}$ Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].
Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. _1-1_1, XP010715117 ISBN: 978-977-5031-77-8.
Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.
Soobul, Y., et al. "Digital chaotic coding and modulation in CDMA" IEEE AFRICON 2002 Oct. 2, 2002,Oct. 4, 2002, pp. 841-846, XP002575052 Retrieved from the Internet: URL:http://ieeexplore.ieee.orq> [retrieved on Mar. 23, 2010].
Rabiner, Lawrence R., "A Tutorial on Hidden Markov Models and Selected Applications in Speech Recognition", Proceedings of the IEEE, vol. 77, No. 2, Feb. 1989.
Boyar, "Inferring Sequences Produce by Pseudo-Random Number Generators", Journal of the Associate for Computing Machine, vol. 36, No. 1, pp. 20-41, 1989.
Barile, M., "Bijective", From MathWorld-A Wolfram Web Resource, created by Eric W. Weisstein, [online] [retrieved on Nov. 8, 2010] Retrieved from the Internet: <http://mathworld.wolfram.com/Bijective.html>.
Weisstein, E., Surejection:, From MathWorld-AWolfram Web Resource [online] [retrieved on Nov. 8, 2010] Retrieved from the Internet: <http://mathworld.wolfram.com/surjection.html>.
Weisstein, E., Surejection:, From MathWorld-AWolfram Web Resource [online] [retrieved on Nov. 8, 2010] Retrieved from the Internet: http://mathworld.wolfram.com/injection.html>.
Harris Corp., International Search Report mailed Feb. 11, 2010, Application Serial No. PCT/US2009/059948.
Harris Corp., International Search Report mailed Apr. 13, 2010, Application Serial No. PCT/US2009/0069121.
Harris Corp., International Search Report mailed Apr. 13, 2010, Application Serial No. PCT/US2009/0069118.
Harris Corp., European Search Report mailed Mar. 4, 2010, Patent Application No. 08009745.4.
Taylor, F.J., "Residue Arithmetic A Tutorial with Examples", Computer, vol. 17, No. 5, pp. 50-62, May 1984, doi: 10.1109/MC. 1984. 1659138.
Barda, A; et al., "Chaotic signals for multiple access communications," Electrical and Electronics Engineers in Israel, 1995, Eighteenth Convention of, vol., No., pp. 2.1.3/1-2.1/3/5, Mar 7-8, 1995.
Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.
Information about Related Patents and Patent Applications, see section 6 of the accompanying Information Disclosure Statement Letter, which concerns Related Patents and Patent Applications.
Menezes, Vanstone, Oorschot: "Handbook of Applied Cryptography", 1997, CRC Press LLC, USA, XP002636791, p. 80-p. 85, p. 238-242.
Schneier, Bruce: "Applied Cryptography Second Edition", 1997, John Wiley & Sons, USA, XP002636792, p. 254-p. 255.
Office Action issued in Japanese Patent Application No. 2010-504206 in the name of Harris Corporation; mailed Jan. 6, 2012.
Bender, et al., "Techniques for data hiding", 1995, IBM Systems Journal, vol. 35, pp. 313-336.
Japanese Office Action dated Aug. 29, 2012, Application Serial No. 2011-531166 in the name of Harris Corporation.

* cited by examiner

SYMBOL ESTIMATION FOR CHAOTIC SPREAD SPECTRUM SIGNAL

BACKGROUND OF THE INVENTION

1. Statement of the Technical Field

The invention concerns communications systems. More particularly, the invention concerns systems and methods for improving symbol estimation in spread spectrum communications.

2. Description of the Related Art

There are many types of communications systems known in the art, such as multiple access communications systems, low probability of intercept/low probability of detection (LPI/LPD) communications systems and spread spectrum communications systems. Many of these systems depend on equal duration symbols, and/or equal energy spreading sequences. Other systems induce exploitable correlations via square-wave pulse shaping to improve reception. Non-square wave spreading sequences (including chaotic spreading sequences) have also been employed but require significantly more computational power to synchronize due to the non-stationary temporal distribution of signal energy. As used herein, non-stationary refers to a sequence or signal that fails to be wide sense stationary, which is approximately equal to having a constant expected energy or value during any arbitrarily chosen equal-length time interval. Most spread spectrum communication systems based on equal energy spreading sequences may be treated as stationary, while non-equal energy based spreading sequences (such as a chaotic spreading sequence) approximate stationary systems in their long-term behavior only; bit error rates (BER) and other symbol-duration dynamics are degraded when models and algorithms treating the non-stationary spreading sequence as stationary are employed. However, models that deal with stationary signals are much easier to construct and use.

Communication signals employing non-equal energy spreading sequences are typically more secure and robust to interferers, especially those that approach the maximal entropy signals considered ideal for channel capacity transmission of energy in a flat AWGN channel. A primary example of a non-stationary spreading sequence that has applicability in spread spectrum communications is a chaotic spreading sequence. As described herein, a chaotic spreading sequence consists of a sequence of numbers having values that appear to have unpredictable transitions characteristics following that of a mathematically chaotic evolution and near ideal statistical properties, yet follow a well-defined deterministic evolution.

In some cases, communication systems use a form of amplitude modulation, such as quadrature amplitude modulation (QAM) for transmitting communication signals. QAM is a modulation scheme in which two sinusoidal carriers, one exactly 90 degrees out of phase with respect to the other, are used to transmit data over a given physical channel. Because the orthogonal carriers occupy the same frequency band and differ by a 90 degree phase shift, each can be modulated, transmitted over the same frequency band, and separated by demodulation at the receiver. Thus, each symbol can be represented by a particular combination of phase shift and amplitude shift in two orthogonal dimensions, leading to higher user data capacities in the same channel. However, as the number of symbols represented by the sinusoidal carriers is increased without increasing the power envelope for the signals, the Hamming distance between symbols is decreased. This typically results in symbols that are more susceptible to noise and other corruptions, leading to higher bit error rates and less reliable delivery of data. In particular, the use of a non-stationary spreading sequence to spread an amplitude modulated data symbol is susceptible some level of degradation caused by natural variations in the symbol energy that change dynamically on a symbol by symbol basis. Combining the capabilities of the higher capacity data modulations with the susceptibility of a non-stationary spreading sequence to symbol energy variations, there is a need for methods or mechanisms to normalize the non-stationary symbol energy in order to improve data reception capabilities.

SUMMARY OF THE INVENTION

Embodiments of the invention provide systems and methods for improving symbol estimation in spread spectrum communications. In a first embodiment of the invention, a method for improving symbol estimation in a received data signal is provided. The method includes the step of receiving an input data signal at the receiver, the input data signal includes at least one modulated carrier encoded with a sequence of information symbols, the modulated carrier modulated using a sequence of discrete time chaotic samples generated at a transmitter, each of the discrete time chaotic samples having a shorter sample time interval than a duration of transmission of each of the plurality of information symbols. The method also includes the step of generating the sequence of discrete-time chaotic samples at the receiver. The method further includes the step of synchronizing the input data signal in time, phase, and frequency with the sequence of discrete-time chaotic samples generated at the receiver, and obtaining one or more normalization factor values for each of the plurality of information symbols based on comparing a received symbol energy for each of the plurality of information symbols and a symbol energy of the discrete-time chaotic samples associated with the duration of transmission for each of the plurality of symbols.

In a second embodiment of the invention, a computer-readable storage medium is provided, having stored therein a computer program for improving symbol estimation in a receiver. The computer program includes a plurality of code sections executable by a computer. The computer program includes code sections for causing the computer to digitize an input data signal, the input data signal includes a modulated carrier encoded with a sequence of information symbols, the carrier modulated using a sequence of discrete time chaotic samples generated at remote location, each of the discrete time chaotic samples having a shorter sample time interval than a duration of transmission of each of the plurality of information symbols. The computer program also includes code sections for causing the computer to generate the sequence of discrete-time chaotic samples and synchronize the digitized signal in time, phase, and frequency with the generated sequence of discrete-time chaotic samples generated. The computer program further includes code sections for causing the computer to obtain one or more normalization factor values for each of the plurality of information symbols based on comparing a received symbol energy for each of the plurality of information symbols and a symbol energy of the discrete-time chaotic samples associated with the duration of transmission for each of the plurality of symbols.

In a third embodiment of the invention, a communications system is provided. The system includes RF hardware configured for receiving a input data signal, the input data signal includes at least one modulated carrier encoded with a sequence of information symbols, the modulated carrier modulated using a sequence of discrete time chaotic samples generated at a transmitter, each of the discrete time chaotic samples having a shorter sample time interval than a duration of transmission of each of the plurality of information symbols. The system also includes a chaotic sequence generator configured for generating a sequence of discrete-time chaotic samples identical to the sequence of discrete-time chaotic samples generated at the transmitter and the correlator. The correlator is configured for synchronizing the input data signal in time, phase, and frequency with the identical sequence of discrete-time chaotic samples, and obtaining one or more normalization factor values for each of the plurality of information symbols based on comparing a received symbol energy for each of the plurality of information symbols and a symbol energy of the discrete-time chaotic samples associated with the duration of transmission for each of the plurality of symbols.

BRIEF DESCRIPTION OF THE DRAWINGS

Embodiments will be described with reference to the following drawing figures, in which like numbers represent like items throughout the figures, and in which.

DETAILED DESCRIPTION

Figure 1:
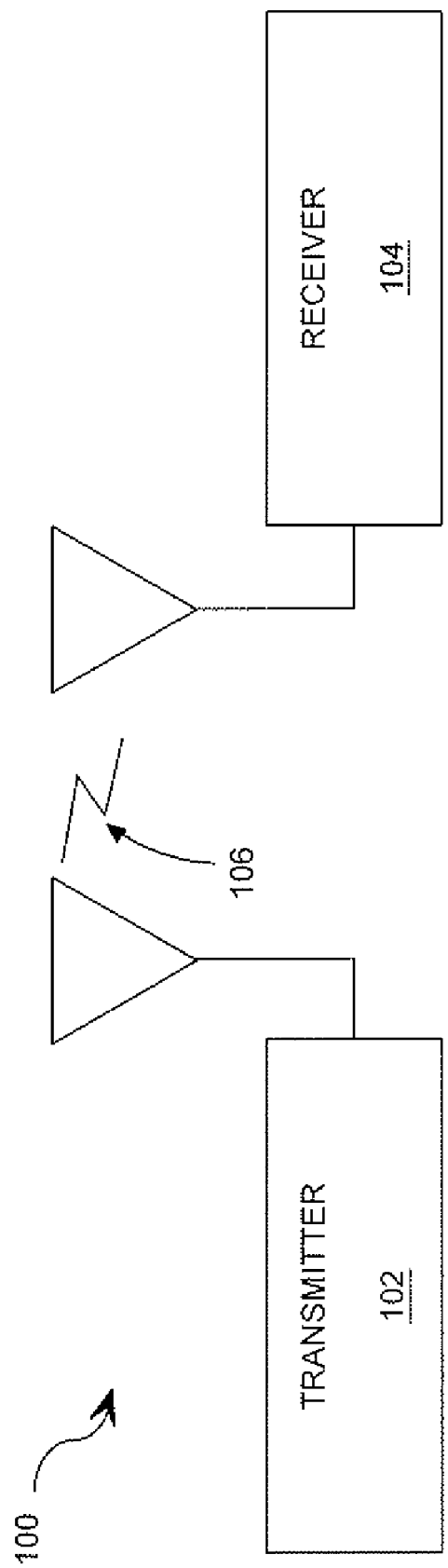
FIG. 1 is a block diagram of a coherent chaotic spread-spectrum communication system according to an embodiment of the invention.

The invention concerns a method for improving symbol estimation of symbols in chaotically coherent spread spectrum signals. That is, a spread spectrum signal generated by combining information bits of a data signal with sequence of chaotic digits, where the rate of the data sequence is much lower than the rate of the spreading sequence. The techniques in this description will be presented with regards to multi-level chaotic spreading sequences, although they apply more generally to the entire class of non-stationary spreading sequences as used in spread spectrum communication systems. At the receiving end, a corresponding chaotic de-spreading sequence that is synchronized with the spreading sequence is used to recover the information bits contained in the data signal. Samples of the received signal are obtained at a rate corresponding to the rate of the chaotic spreading sequence and the signal is then de-spread mathematically using a correlation process. A priori knowledge of the chaotic spreading sequence used in the transmitted spread spectrum signal permits coherent recombination of the data signal, increasing the effective signal-to-noise ratio (SNR) for the spread spectrum signal. In some cases, a priori knowledge of the spreading sequence also allows selective reconstruction of the data signal by discounting samples with a disproportionately low SNR. By discounting samples with a disproportionately low SNR, the effective SNR is further improved.

Although a chaotic spreading sequence with or without selective signal recombination may be used in a correlator for de-spreading of a data signal with improved SNR, such signals can still result in bit rate errors when the differences in phase and/or amplitude between symbols are small. In particular, as the number of symbols represented increases for a fixed power envelop, the differences in phase and amplitude among the different symbols is decreased. Accordingly, as the phase and amplitude of a chaotic spread spectrum signal representing a particular symbol vary under normal transmission conditions, the likelihood of improperly estimating which symbol has been transmitted increases. For example, consider two different symbols represented by chaotic spread spectrum signals with the same phase but different amplitudes. For these two signals, if the difference in amplitude after de-spreading is less than the variation in amplitude typically observed at a receiver for each of the symbols, the likelihood that both symbols could result in incorrect amplitude decisions is increased, resulting in bit increased errors.

The present Inventors have discovered that the actual measured energy of a chaotic spread spectrum signal, which varies or is non-stationary on a symbol basis, can be combined with the expected or stationary symbol energy to generate a normalization factor that partially corrects the amplitude of the de-spread signals. The present Inventors note that since the chaotic spreading sequence is known a priori in a coherent chaotic communication system, the expected and measured symbol energy can be calculated directly from a sum of the energies of each of the samples of the chaotic spreading sequence and the received signal. Once the normalization factor is obtained, the amplitude of the de-spread signal can be scaled to provide an improved amplitude estimate for the de-spread signal that is closer to the expected amplitude of a de-spread signal for the transmitted symbol, reducing the likelihood of improper symbol estimation at a receiver.

The invention will now be described more fully hereinafter with reference to accompanying drawings, in which illustrative embodiments of the invention are shown. This invention, may however, be embodied in many different forms and should not be construed as limited to the embodiments set forth herein. For example, the invention can be embodied as a method, a data processing system or a computer program product. Accordingly, the invention can take the form as an entirely hardware embodiment, an entirely software embodiment or a hardware/software embodiment.

Communications System

Referring now to FIG. 1, there is provided a coherent chaotic spread-spectrum communication system (CCSCS) 100 that is useful for understanding the invention. The coherent chaotic spread-spectrum communication system 100 is comprised of a transmitter 102 and a receiver 104. The coherent chaotic spread-spectrum communication system 100 typically operates such that a transmitted signal has a spread power level below the receiver 104 noise floor. As stated above, the term "noise floor" as used herein refers to the level of noise which exists in a signal, measured at the input of a receiver.

The transmitter 102 is configured to generate a data signal and to spread the data signal over a wide intermediate frequency band. This spreading consists of multiplying each sample of the data signal by a respective random number sequence of an internally generated chaotic sequence to generate a digitally modulated chaotic signal. This digital chaotic signal is locally non-stationary, meaning that the short-term integration of the chaotic signal energy will have an appreciable variance relative to its expected value. This non-stationary signal is used to spread data symbols over a wide bandwidth via modulation, such symbols being channel encoded with a phase shift keying (PSK). Any channel encoding type can be used without limitation; examples of such modulations are QPSK, 16QAM, 16APSK. Choosing consistent data symbol durations results in data symbols having varying energy levels. The transmitter 102 is also configured to process the modulated chaotic signal to place the same in a proper form suitable for transmission over a communications link. The transmitter 102 is further configured to communicate processed chaotic signals 106 to the receiver 104 via a communications link. The transmitter 102 will be described in greater detail below in relation to FIG. 2.

The receiver 104 is configured to receive transmitted chaotic signals 106 from the transmitter 102. As will be described in the following paragraphs, the receiver 104 is configured to normalize the non-stationary signal energy of the transmitted chaotic signal 106, which has significant advantages for chaotically spread amplitude modulations.

The receiver 104 is further configured to down convert, digitize, and de-spread a transmitted analog chaotic signal by correlating it with a replica of the chaotic sequence generated at the transmitter 102. The chaotic sequence is also time synchronized to the transmitted analog chaotic signal 106. The output of the arithmetic operation that de-spreads the received signal is hereinafter referred to as a de-spread signal. The receiver 104 is further configured to adjust or normalize the de-spread signal to improve symbol estimation prior to processing of the de-spread signal to retrieve the data therein by comparing the received or non-stationary symbol energy with an expected symbol energy based on the chaotic spreading sequence. The receiver 104 is also configured to process a de-spread signal for obtaining data contained therein. The receiver 104 is configured to convert the data into text, sound, pictures, navigational-position information, and/or any other type of useful payload information that can be communicated. The receiver 104 is described in greater detail below in relation to FIG. 3.

Figure 2:
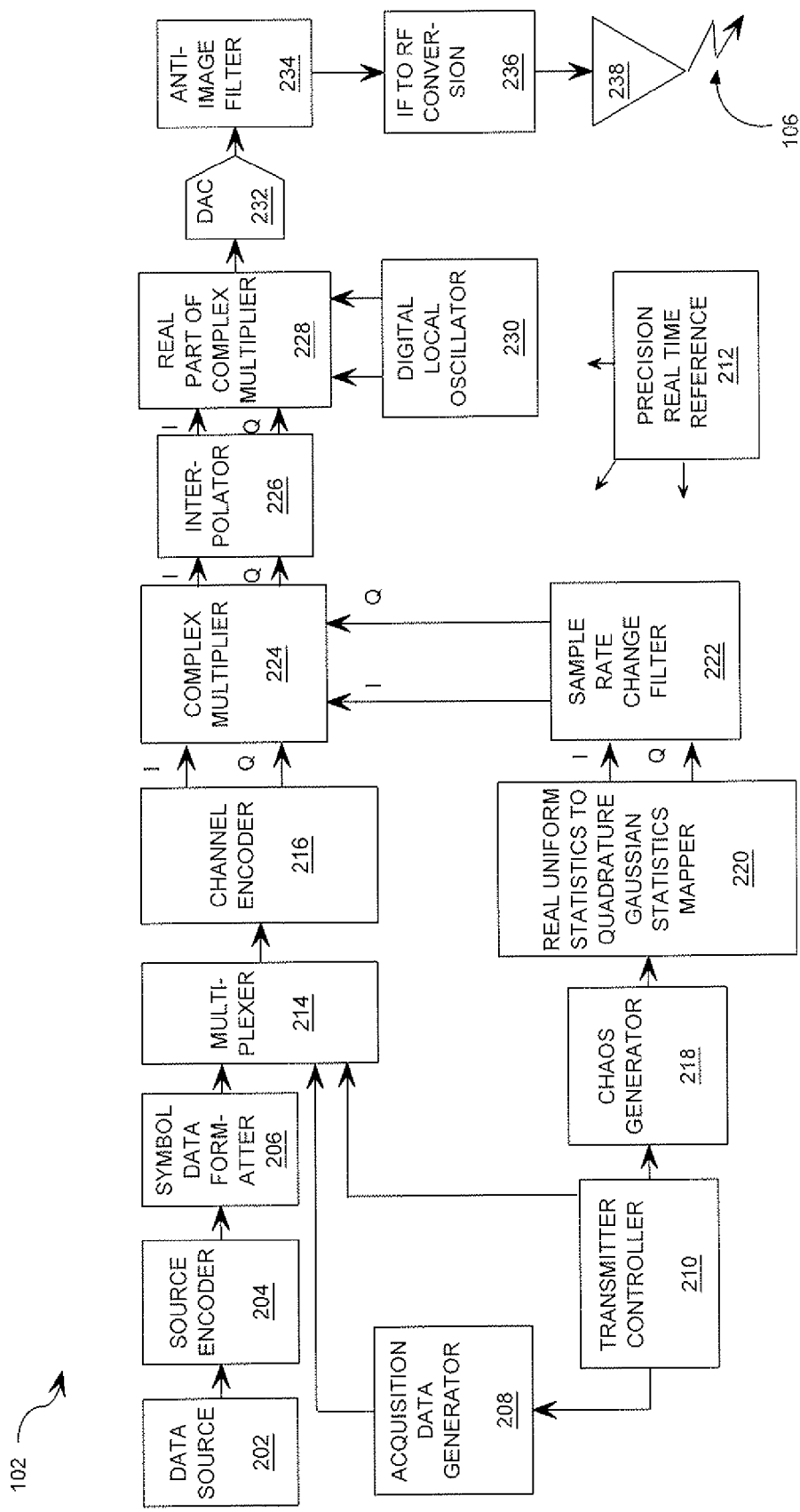
FIG. 2 is a more detailed block diagram of the transmitter of FIG. 1.

Referring now to FIG. 2, there is provided a block diagram of the transmitter 102 shown in FIG. 1. The transmitter 102 is comprised of a data source 202. The transmitter 102 is also comprised of a source encoder 204, a symbol data formatter 206, an acquisition data generator 208, a transmitter controller 210, a multiplexer 214, a channel encoder 216, a precision real time reference 212, and a digital complex multiplier 224. The transmitter 102 is further comprised of a chaos generator 218, a real uniform statistics to quadrature Gaussian statistics mapper device (RUQG) 220, and a sample rate change filter (SRCF) 222. The transmitter 102 is further comprised of an interpolator 226, a digital local oscillator (LO) 230, a real part of a complex multiplier 228, a digital-to-analog converter (DAC) 232, an anti-image filter 234, an intermediate frequency (IF) to radio frequency (RF) conversion device 236, and an antenna element 238.

Referring again to FIG. 2, the data source 202 is configured to receive bits of data from an external data source (not shown) as bits of data. In this regard, it should be appreciated that the data source 202 is an interface configured for receiving an input signal containing data from an external device (not shown). The data source 202 is further configured to supply bits of data to the source encoder 204 at a particular data transfer rate. The source encoder 204 can be configured to encode the data received from the external device (not shown) using a forward error correction coding scheme. The bits of data received at or generated by the source encoder 204 represent any type of information that may be of interest to a user. For example, the data can be used to represent text, telemetry, audio, or video data. The source encoder 204 is further configured to supply bits of data to the symbol data formatter 206 at a particular data transfer rate.

The symbol data formatter 206 is configured to process bits of data for forming data words for the channel encoded symbols. The source encoded symbols are phase shift keyed (PSK) encoded. The symbol data formatter 204 can also be configured to differentially encode formed PSK symbols. Differential encoding is well known to one of ordinary skill in the art and therefore will not be described in detail herein. The symbol data formatter 206 can be further configured to communicate non-differentially encoded PSK symbol data words and/or differentially encoded PSK symbol data words to the multiplexer 214. Still, the invention is not limited in this regard.

According to an embodiment of the invention, the symbol data formatter 206 is functionally similar to a serial in/parallel out shift register where the number of parallel bits out is equal to log base two ($\log_2$) of the order of the channel encoder 216. In this regard, the symbol data formatter 206 is selected for use with a quadrature phase shift keying (QPSK) channel encoder. As such, the symbol data formatter 206 is configured to perform a QPSK formatting function for grouping two (2) bits of data together to form a QPSK symbol data word (i.e., a single two bit parallel word). Thereafter, the symbol data formatter 206 communicates the encoded QPSK symbol data word to the multiplexer 214. Still, the invention is not limited in this regard.

According to additional embodiments of the invention, the symbol data formatter 206 is selected for use with other digital modulation techniques employing controlled amplitude or phase modulation. Such digital modulation techniques include a sixteen quadrature amplitude modulation (16QAM) channel encoder, a binary phase-shift keying (BPSK) channel encoder, a sixteen amplitude and phase-shift keying (APSK) channel encoder, or a more general arbitrary data signal constellation channel encoder. Other modulation techniques (such as on-off-keying, amplitude shift keying, and frequency shift keying) may also be used. Channel encoding techniques are well known to those having ordinary skill in the art, and therefore will not be described herein. As such, the symbol data formatter 206 is configured to map data bits to modulation symbol data words and then communicate the symbol data words to the multiplexer 214. Still, the invention is not limited in this regard.

The transmitter 102 also includes an acquisition data generator 208 capable of generating a "known data preamble" that can be used to facilitate initial synchronization of a chaotic sequence generated in the transmitter 102 and the receiver 104. The duration of this "known data preamble" is determined by an amount required by the receiver 104 to synchronize with the transmitter 102 under known worst case channel conditions. In some embodiments of the invention, the "known data preamble" is a repetition of the same known symbol. In other embodiments of the invention, the "known data preamble" is a series of known symbols. The acquisition data generator 208 can be further configured to communicate the "known data preamble" to the multiplexer 214.

Referring again to FIG. 2, the multiplexer 214 is configured to receive the binary word to be modulated by the channel encoder from the symbol data formatter 206. The multiplexer 214 is also configured to receive a "known data preamble" from the acquisition data generator 208. The multiplexer 214 is coupled to the transmitter controller 210. The transmitter controller 210 is configured to control the multiplexer 214 so that the multiplexer 214 routes the "known data preamble" to the channel encoder 216 at the time of a new transmission.

According to an alternative embodiment of the invention, the "known data preamble" is stored in a modulated form. In such a scenario, the architecture of FIG. 2 is modified such that the multiplexer 214 exists after the channel encoder 216. Still, the invention is not limited in this regard.

According to another embodiment of the invention, a "known data preamble" may be injected at known intervals to aid in periodic resynchronization of the chaotic sequence generated in the transmitter 102 and the receiver 104. This would typically be the case for an implementation meant to operate in harsh channel conditions. Still, the invention is not limited in this regard.

Referring again to FIG. 2, the multiplexer 214 is configured to select the symbol data words to be routed to the channel encoder 216 after a preamble period has expired. The multiplexer 214 is also configured to communicate the data words to the channel encoder 216. In this regard, it should be appreciated that a communication of the symbol data words to the channel encoder 216 is delayed by a time defined by the length of the "known data preamble." As should be appreciated, this delay allows all of a "known data preamble" to be fully communicated to the channel encoder 216 prior to communication of the data symbols.

Referring again to FIG. 2, the channel encoder 216 is configured to perform actions for representing the "known data preamble" data words and the symbol data words in the form of a modulated amplitude-and-time-discrete digital signal. The modulated amplitude-and-time-discrete digital signal is defined by digital words which represent intermediate frequency (IF) modulated symbols comprised of bits of data having a one (1) value or a zero (0) value. Methods for representing digital symbols by an amplitude-and-time-discrete digital signal are well known to one of ordinary skill in the art. Thus, such methods will not be described in detail herein. However, it should be appreciated that the channel encoder 216 can employ any such method. For example, the channel encoder 216 can be selected as a digital baseband modulator employing quadrature phase shift keying (QPSK). As will be appreciated by one of ordinary skill in the art, the output of the QPSK modulator will include an in-phase ("I") data and quadrature phase ("Q") data. The I and Q data will be thereafter communicated to the digital complex multiplier 224. As described previously, any modulation type, including those that incorporate amplitude modulation characteristics, may be implemented without limitation.

According to an embodiment of the invention, the transmitter 102 is further comprised of a sample rate matching device (not shown) between the channel encoder 216 and the digital complex multiplier 224. The sample rate matching device (not shown) is provided for synchronizing the symbol time with an integer multiple of the chaos sample time. Still, the invention is not limited in this regard.

Referring again to FIG. 2, the digital complex multiplier 224 performs a complex multiplication in the digital domain. In the digital complex multiplier 224, the amplitude-and-time-discrete digital signal from the channel encoder 216 is multiplied by a digital representation of a chaotic sequence. The chaotic sequence is generated in the chaos generator 218. The chaos generator 218 is described below with respect to FIGS. 5-7.

The rate at which the digital chaotic sequence is generated is an integer multiple of the symbol rate. The greater the ratio between the data symbol period and the chip period of the digital chaotic sequence, the higher a spreading gain. The chaos generator 218 communicates the chaotic sequence to a RUQG 220. The RUQG 220 is configured to statistically transform a digital chaotic sequence into a transformed digital chaotic sequence with pre-determined statistical properties. The transformed digital chaotic sequence can have a characteristic form including combinations of real, complex, or quadrature, being of different word widths, and having different statistical distributions. For example, the RUQG 220 may take in two (2) uniformly distributed real inputs from the chaos generator 218 and convert those via a complex-valued bivariate Box-Muller transformation to a quadrature output having statistical characteristics of a Gaussian distribution. Such conversions are well understood by one of ordinary skill in the art, and therefore will not be described in detail herein. However, it should be understood that such techniques may use nonlinear processors, look-up tables, iterative processing (CORDIC functions), or other similar mathematical processes. The RUQG 220 is further configured to communicate transformed chaotic sequences to the SRCF 222.

The statistically transformed output of the digital chaotic sequence has a multi-bit resolution consistent with a resolution of the DAC 232. The RUQG 220 communicates the statistically transformed output of the digital chaotic sequence to the SRCF 222. For example, the RUQG 220 communicates an in-phase ("I") data and quadrature phase ("Q") data to the SRCF 222 when the channel encoder 216 is configured to yield a complex output representation. Still, the invention is not limited in this regard.

If a chaos sample rate of the transformed chaotic sequence is different than a sample rate required by subsequent signal processing, then the two rates must be matched. The chaotic sequence can therefore be resampled in the SRCF 222. For example, SRCF 222 can be comprised of real sample rate interpolation filters to upsample each of the in-phase and quadrature-phase processing paths of the chaotic sequence. As should be appreciated, the SRCF 222 performs a sample rate change on the transformed digital chaotic sequence so that a sample rate of the transformed digital chaotic sequence is the same as an amplitude-and-time-discrete digital signal required by downstream processing. The SRCF 222 is also configured to communicate a resampled, transformed digital chaotic sequence to the digital complex multiplier 224.

According to an embodiment of the invention, the RUQG 220 statistically transforms a digital chaotic sequence into a quadrature Gaussian form of the digital chaotic sequence. This statistical transformation is achieved via a nonlinear processor that combines lookup tables and embedded computational logic to implement the conversion of two (2) independent uniformly distributed random variables into a quadrature pair of Gaussian distributed variables. One such structure for this conversion is as shown in the mathematical expressions (1) and (2).

$$G_1 = \sqrt{-2\log(u_1)} \cdot \cos(2\pi u_2) \qquad (1)$$

$$G_2 = \sqrt{-2\log(u_1)} \cdot \sin(2\pi u_2) \qquad (2)$$

where $\{u_1, u_2\}$ are uniformly distributed independent input random variables and $\{G_1, G_2\}$ are Gaussian distributed output random variables. In such a scenario, the SRCF 222 is comprised of one sample rate change filter to resample an in-phase ("I") data sequence and a second sample rate change filter to resample a quadrature-phase ("Q") data sequence. The SRCF 222 is configured to communicate a resampled, transformed digital chaotic sequence to the digital complex multiplier 224. More particularly, the SRCF 222 communicates an in-phase ("I") data and quadrature phase ("Q") data to the digital complex multiplier 224. Still, the invention is not limited in this regard.

According to another embodiment of the invention, the amplitude-and-time-discrete digital signal and the digital chaotic sequence are generated as zero intermediate frequency (IF) signals. Also, pulse shaping is not employed. Still, the invention is not limited in this regard.

The digital complex multiplier 224 performs a complex multiplication on the digital chaotic sequence output from the SRCF 222 and the amplitude-and-time-discrete digital channel encoded signal output from the channel encoder 216 via a sample rate matching device (not shown). The resulting output is a digital representation of a coherent chaotic sequence spread spectrum modulated IF signal in which the digital data from the channel encoder 216 has been spread over a wide frequency bandwidth in accordance with a chaotic sequence generated by the chaos generator 218.

The digital complex multiplier 224 is configured to combine a digital chaotic sequence with an amplitude-and-time-discrete digital channel encoded signal using an arithmetic operation. The arithmetic operation is selected as a complex-valued digital multiplication operation. The complex-valued digital multiplication operation includes multiplying the amplitude-and-time-discrete digital channel encoded signal by the digital chaotic sequence to obtain a digital chaotic output signal. The digital complex multiplier 224 is also configured to communicate the digital chaotic output signals to the interpolator 226.

The interpolator 226, real part of complex multiplier 228 and quadrature digital local oscillator 230 operate in tandem to form an intermediate frequency (IF) translator which frequency modulates a quadrature first intermediate frequency (IF) signal received from the complex multiplier to a second real intermediate frequency (IF) signal. Such digital intermediate frequency (IF) translators are known to one of ordinary skill in the art and shall not be discussed in detail here.

The interpolator 226 accepts an input from the complex multiplier 224. In one embodiment the modulated symbols are in quadrature form and the interpolator is implemented as two real interpolators. Still, the invention is not limited in this regard.

The interpolator 226 raises the sample rate of the amplitude-and-time-discrete digital signal received from the complex multiplier 224 to a rate compatible with the bandwidth and center frequency of the second IF. The digital local oscillator 230 generates a complex quadrature amplitude-and-time-discrete digital sinusoid at a frequency which shall translate the first intermediate frequency (IF) to a desired second intermediate frequency (IF). The digital local oscillator 230 is also configured to pass its output to the real part of complex multiplier 228.

The real part of complex multiplier 228 is configured to accept as its inputs the quadrature output of the interpolator 228 and the quadrature output of the digital local oscillator 230. The real part of a complex multiplication is passed so that the real part of complex multiplier 228 implements only the real output portion of a complex multiplication. The real part of complex multiplier 228 is configured to pass its output to the DAC 232. Still, the invention is not limited in this regard.

According to an embodiment of the invention, the digital chaotic sequence and the amplitude-and-time-discrete digital signal are zero intermediate frequency (IF) signals. The digital chaotic sequence is used to amplitude modulate the "known data preamble" and the data symbols via an efficient instantiation of a complex multiplier. The result of this amplitude modulation process is a zero IF signal. Still, the invention is not limited in this regard.

Referring again to FIG. 2, the IF translator and specifically the real part of the complex multiplier 228 are configured to communicate a sampled digital chaotic output signal (i.e., a digital chaotic output signal having an increased sampling rate and non-zero center frequency) to the DAC 232. The DAC 232 is configured to convert a sampled digital chaotic output signal to an analog signal. The DAC 232 is also configured to communicate an analog signal to the anti-image filter 234.

According to an embodiment of the invention, the digital complex multiplier 224 multiplies I and Q data of an amplitude-and-time-discrete digital channel encoded signal by I and Q data of digital chaotic sequence to obtain a digital chaotic output signal. The digital chaotic output signal is a quadrature, zero IF signal. The digital complex multiplier 224 communicates the quadrature, zero IF signal to DAC 232. The DAC 232 is an interpolating DAC that increases the effective sample rate and translates a real part of the signal to a second IF. Still, the invention is not limited in this regard.

Referring again to FIG. 2, the anti-image filter 234 is configured to remove spectral images from the analog signal to form a smooth time domain signal. The anti-image filter 234 is also configured to communicate a smooth time domain signal to a RF translator 236. The RF translator 236 is a wide bandwidth analog IF to RF up converter. The RF translator 236 is configured to center a smooth time domain signal at an RF for transmission thereby forming an RF signal. The RF translator 236 is also configured to communicate the RF signal to the power amplifier (not shown). The power amplifier (not shown) is configured to amplify a received RF signal. The power amplifier (not shown) is configured to communicate the amplified RF signal to the antenna element 238 for communication to a receiver 104 (described below in relation to FIG. 3A).

It should be understood that the digital generation of the digital chaotic sequence at the transmitter 102 and receiver 104 is kept closely coordinated under the control of a precision real time references 212 and 336, respectively. The higher the precision of the references 212, 336, the closer the synchronization of the chaos generator 218 of the transmitter 102 and the chaos generator (described below in relation to FIG. 3) of the receiver 104 shall be excluding the effects of processing delay differences and channel propagation times. The use of a precision real time reference allows the states of the chaos generators to be easily controlled with accuracy.

Referring again to FIG. 2, the precision real time reference 212 is a stable local oscillator locked to a precision real time reference, such as a GPS clock receiver or a chip scale atomic clock (CSAC). The precision real time reference 212 is configured to supply a high frequency clock to the clocked logic circuits 204 through 232 while being locked to a lower frequency reference clock. The lower frequency reference clock supplies a common reference and a common real time of day reference to prevent a large drift between the states of the chaos generator 218 and the chaos generator (described below in relation to FIG. 3) of the receiver 104 over an extended time interval.

One of ordinary skill in the art will appreciate that the transmitter 102 is one architecture of a communications system transmitter. However, the invention is not limited in this regard and any other transmitter architecture can be used without limitation. For example, the transmitter 102 can include real first to second intermediate frequency (IF) translation instead of a quadrature first to second intermediate frequency (IF) translation. As another example, other architectures may employ additional chaotic sequence generators to provide a switched chaotic output or to control other aspects of the transmitter 102.

Additionally, although FIG. 2 shows a configuration of transmitter 102 which transmits a signal 106 which is the combination of the two modulated carriers associated with the two sets of data (I and Q), the invention is not limited in this regard. In other embodiments of the invention, transmitter 102 can be configured to transmit signal 106 which is the combination of two or more modulated carriers, each associated with a set of data. That is, components 216-230 can be configured to include two or more paths, each associated with a modulation carrier.

Figure 3:
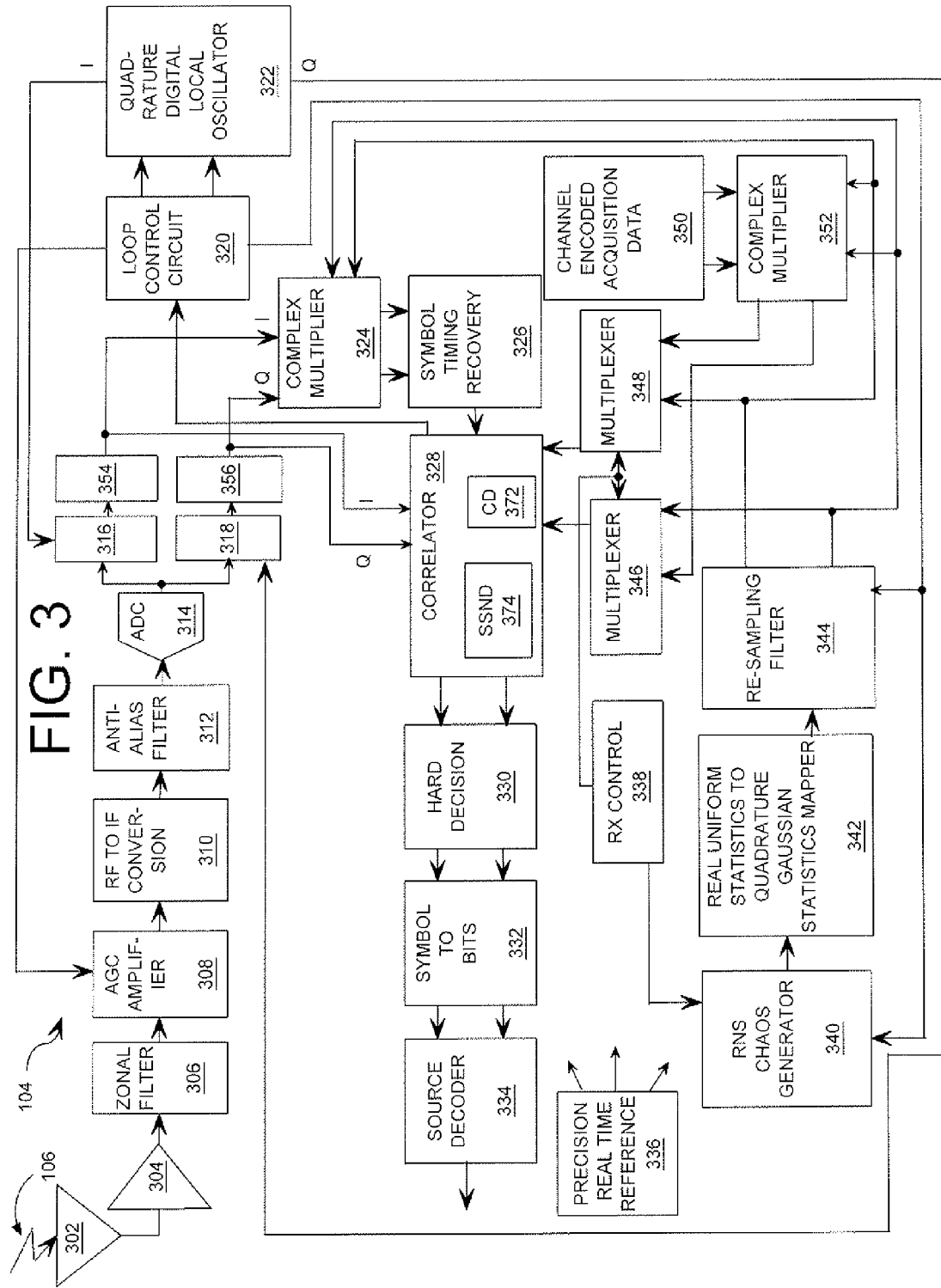
FIG. 3 is a more detailed block diagram of the receiver of FIG. 1.

Referring now to FIG. 3, there is provided a block diagram of the receiver 104 of FIG. 1. It should be noted that in conventional analog based coherent communications systems analog chaos circuits are synchronized by periodically exchanging state information. The exchange of state information requires a substantial amount of additional bandwidth. This repeated exchange of chaotic state information is what makes analog based coherent communications impracticable. The receiver 104 of FIG. 3 is designed to eliminate the drawbacks of conventional analog based coherent communications systems. In this regard it should be appreciated that the receiver 104 is comprised of a digital chaos generator. The receiver 104 includes a tracking loop for synchronizing its digital chaos generator and the digital chaos generator 218 of the transmitter 102. Most significantly, the receiver is configured to synchronize two (2) sequences of discrete time chaotic samples without using a constant or periodic transfer of state update information. A first sequence of discrete time chaotic samples is generated at the transmitter 102. A second sequence of discrete time chaotic samples is generated at the receiver 104.

Referring again to FIG. 3, the receiver 104 is comprised of an antenna element 302, a low noise amplifier (LNA) 304, a zonal filter 306, an AGC amplifier 308, a radio frequency (RF) to intermediate frequency (IF) conversion device 310, an anti-alias filter 312, and an analog-to-digital (A/D) converter 314. The receiver 104 is also comprised of real multipliers 316, 318, lowpass filters 354, 356, a loop control circuit 320, a quadrature digital local oscillator 322, a correlator 328, multiplexers 346, 348, a channel encoded acquisition data generator (CEADG) 350, digital complex multipliers 324, 352, and a symbol timing recovery circuit 326. The receiver 104 is further comprised of a receiver controller 338, a precision real time reference clock 336, a hard decision device 330, a symbol to bits (S/B) converter 332, and a source decoder 334. The receiver 104 is comprised of a chaos generator 340, a real uniform statistic to quadrature Gaussian statistic mapper (RUQG) 342, and a re-sampling filter 344. Each of the above listed components and circuits 302-318, 322-326, 330-338, 342-356 are well known to one of ordinary skill in the art. Thus, these components and circuits will not be described in detail herein. However, a brief discussion of the receiver 104 architecture is provided to assist a reader in understanding the invention. It should be noted that when the receiver 104 is in both acquisition and tracking modes (described below) the receiver 104 is utilizing a novel architecture/algorithm.

Referring again to FIG. 3, the antenna element 302 is configured to receive an analog input signal communicated from the transmitter 102 over a communications link. The antenna element 302 is also configured to communicate the analog input signal to the LNA 304. The LNA 304 is configured to amplify a received analog input signal while adding as little noise and distortion as possible. The LNA 304 is also configured to communicate an amplified, analog input signal to the zonal filer 306. Zonal filters are analog filters with slow roll off characteristic but low injection loss used to suppress large interfering signals outside of bands of interest. Zonal filters are well known to one of ordinary skill in the art, and therefore will not be described in detail herein. It should be appreciated that the zonal filter 306 is configured to communicate a filtered, analog input signal to the automatic gain control (AGC) amplifier 308. An automatic gain control (AGC) amplifier 308 is a controllable gain amplifier used to keep the magnitude of the received signal within normal bounds for the rest of the signal processing chain. Automatic gain control (AGC) amplifiers are well known to one of ordinary skill in the art, and therefore will not be described in detail herein. It should be appreciated that the automatic gain control (AGC) amplifier 308 is configured to communicate a gain adjusted, analog input signal to the RF to IF conversion device 310.

The RF to IF conversion device 310 is configured to mix the analog input signal to a preferred IF for conversion to a digital signal at the A/D converter 314. The RF to IF conversion device 310 is also configured to communicate a mixed analog input signal to the anti-alias filter 312. The anti-alias filter 312 is configured to restrict a bandwidth of a mixed analog input signal. The anti-alias filter 312 is also configured to communicate a filtered, analog input signal to the A/D converter 314. The A/D converter 314 is configured to convert a received analog input signal to a digital signal. The A/D converter 314 is also configured to communicate a digital input signal to a second IF translator which is comprised of the real multipliers 316, 318, and the programmable quadrature digital local oscillator 322.

The quadrature digital local oscillator 322, real multipliers 316, 318, and lowpass filters 354, 356 combine to form a digital Weaver modulator which forms a baseband quadrature signal from the real IF signal generated by the RF front end 302-310.

The multiplier 316 is configured to receive a digital word as input from the A/D converter 314 and a digital word from the in-phase component of the quadrature digital local oscillator 322. The multiplier 316 multiplies the output of the A/D converter 314 by the in-phase component of the quadrature digital local oscillator 322. The multiplier 316 is also configured to communicate a digital output word. The multiplier 318 is configured to receive a digital word as input from the A/D converter 314 and a digital word from the quadrature-phase component of the quadrature digital local oscillator 322. The multiplier 318 multiplies the output of the A/D converter 314 by the quadrature-phase component of the quadrature digital local oscillator 322. The multiplier 318 is also configured to communicate a digital output word.

The quadrature digital local oscillator 322 generates a complex quadrature amplitude-and-time-discrete digital sinusoid at a frequency which shall translate the first IF to baseband and remove detected frequency and phase offsets in the resulting quadrature baseband signal. The quadrature digital local oscillator accepts as its inputs a binary phase control word and a binary frequency control word from the loop control circuit 320. Quadrature digital local oscillators are known to one of ordinary skill in the art, and therefore will not be described in detail herein. Lowpass filter 354 receives its input from multiplier 316. Lowpass filter 356 receives its input from multiplier 318. The two lowpass filters collectively reject the undesired sideband from the complex result of the multiplications to form an analytic signal. The outputs of lowpass filters 354, 356 form the output of the IF translator.

The IF translator is configured to mix the digital input signal to a preferred IF for processing at the correlator 328 and the digital complex multiplier 324. The IF translator is also configured to communicate a digital input signal to the correlator 328 and the digital complex multiplier 324. As will be appreciated by one of ordinary skill in the art, the output of the IF translator can include an in-phase ("I") data and quadrature phase ("Q") data. As such, the IF translator can communicate I and Q data to the correlator 328 and the digital complex multiplier 324.

The digital complex multiplier 324 is configured to perform a complex multiplication in the digital domain. In the complex-valued digital multiplier 324, the digital input signal from the IF translator is multiplied by a digital representation of a chaotic sequence. The chaotic sequence is generated in the chaos generator 340. The chaos generator 340 is described with respect to FIGS. 5-7.

The chaos generator 340 communicates the chaotic sequence to an RUQG 342. In this regard, it should be appreciated that the chaos generator 340 is coupled to the receiver controller 338. The receiver controller 338 is configured to control the chaos generator 340 so that the chaos generator 340 generates a chaotic sequence with the correct initial state when the receiver 104 is in an acquisition mode and a tracking mode.

The RUQG 342 is configured to statistically transform a digital chaotic sequence into a transformed digital chaotic sequence. The transformed digital chaotic sequence can have a characteristic form including combinations of real, complex, or quadrature, being of different word widths, and having different statistical distributions. One such statistical transformation used in one embodiment is a bivariate Box-Muller distribution that converts two (2) independent uniformly distributed random variables to a pair of quadrature Gaussian distributed variables. The RUQG 342 is further configured to communicate transformed chaotic sequences to the re-sampling filter 344.

According to the embodiment of the invention, the RUQG 342 statistically transforms a digital chaotic sequence into a quadrature Gaussian form of the digital chaotic sequence. The RUQG 342 communicates the quadrature Gaussian form of the digital chaotic sequence to the re-sampling filter 344. More particularly, the RUQG 342 communicates an in-phase ("I") data and quadrature phase ("Q") data to the re-sampling filter 344. Still, the invention is not limited in this regard.

The re-sampling filter 344 is also configured to forward a transformed chaotic sequence to the digital complex multiplier 324. The re-sampling filter 344 is configured as a sample rate change filter for making the chaos sample rate compatible with the received signal sample rate when the receiver 104 is in acquisition mode. The re-sampling filter 344 is also configured to compensate for transmit and receive clock offsets with less than a certain level of distortion when the receiver is in a steady state demodulation mode. In this regard, it should be appreciated that the re-sampling filter 344 is configured to convert a sampling rate of in-phase ("I") and quadrature-phase ("Q") data sequences from a first sampling rate to a second sampling rate without changing the spectrum of the data contained in therein. The re-sampling filter 344 is further configured to communicate in-phase ("I") and quadrature-phase ("Q") data sequences to the digital complex multipliers 324, 352, and the multiplexers 346, 348.

It should be noted that if a sampled form of a chaotic sequence is thought of as discrete samples of a continuous band limited chaos then the re-sampling filter 344 is effectively tracking the discrete time samples, computing a continuous representation of the chaotic sequence, and resampling the chaotic sequence at the discrete time points required to match the discrete time points sampled by the A/D converter 314. In effect, input values and output values of the re-sampling filter 344 are not exactly the same because the values are samples of the same waveform taken at slightly offset times. However, the values are samples of the same waveform so the values have the same power spectral density.

Referring again to FIG. 3, the CEADG 350 is configured to generate a modulated acquisition sequence. The CEADG 350 is also configured to communicate a modulated acquisition sequence to the digital complex multiplier 352. The digital complex multiplier 352 is configured to perform a complex multiplication in the digital domain. This complex multiplication includes multiplying a modulated acquisition sequence from the CEADG 350 by a digital representation of a chaotic sequence to yield a reference for a digital input signal. The digital complex multiplier 352 is also configured to communicate the reference signal to the multiplexers 346, 348. The multiplexer 346 is configured to route the quadrature-phase part of a reference signal to the correlator 328. The multiplexer 348 is configured to route the in-phase part of a reference signal to the correlator 328. In this regard, it should be appreciated that the multiplexers 346, 348 are coupled to the receiver controller 338. The receiver controller 338 is configured to control the multiplexers 346, 348 in tandem so that the multiplexers 346, 348 route the reference signal to the correlator 328 while the receiver 104 is in an acquisition mode (described below).

In the various embodiments of the invention, the correlator 328 is comprised of a correlation device 372 and a soft symbol normalizer device (SSND) 374. The SSND 374 is provided to make a correlation and symbol decision process performed by the correlation device 372 more robust by adjusting the amplitude of a correlated signal for each symbol. In this regard, it should be understood that the SSND 374 implements a soft symbol normalization method involving obtaining a normalization factor for each symbol in the correlated signal based on expected symbol energy calculated using an internally generated chaotic sequence and de-spread symbol energy of the received chaotic signal.

In some embodiments where selective signal recombination is used, the correlator 328 can also include a selective noise cancellation device (SNCD) (not shown). An SNCD can make a correlation process performed by the correlation device 372 more robust by improving the SNR of a received chaotic signal. In these embodiments, an SNCD can implement an adaptive correlation method involving selectively skipping sequence samples including signal and noise based on an internally generated chaotic sequence.

The correlation device 372 is configured to correlate the internally generated chaotic sequence with a digital input signal. In this regard, it should be understood that, the sense of the real and imaginary components of the correlation is directly related to the values of the real and imaginary components of the symbols of a digital input signal. It should also be understood that, in one embodiment, the sense of the real and imaginary components of the correlation is directly related to the values of the real and imaginary components of the PSK symbols of a digital input signal. Thus, when the correlation device 372 is in a steady state demodulation mode the output of the correlation device 372 is PSK symbol soft decisions.

The correlation device 372, via the SSND 374, is also configured to communicate PSK soft decisions to the hard decision device 330 for final symbol decision making. The hard decision device 330 is configured to communicate symbol decisions to the S/B converter 332. The S/B converter 332 is configured to convert symbols to a binary form. The S/B converter 332 is configured to communicate a binary data sequence to the source decoder 334. The source decoder 334 is configured to decode FEC applied at the transmitter and to pass the decoded bit stream to one or more external devices (not shown) utilizing the decoded data.

The correlation device 372 is also configured to acquire initial timing information associated with a chaotic sequence, initial timing associated with a data sequence and to track phase and frequency offset information between the chaotic sequence and a digital input signal. The correlation device 372 is also configured to track input signal magnitude information between the chaotic sequence and a digital input signal. Acquisition of initial timing information and tracking of input signal magnitude, phase and frequency offset information are both standard functions in digital communication systems. As such, methods for acquiring initial timing information and tracking phase and frequency offset information are well known to one of ordinary skill in the art, and therefore will not be described in detail herein. However, it should be appreciated that any such method can be used without limitation.

Referring again to FIG. 3, the correlation device 372 is configured to communicate the magnitude and phase information as a function of time to the loop control circuit 320. The loop control circuit 320 uses the magnitude and phase information to calculate the deviation of the input signal magnitude from a nominal range, and phase and frequency offset information to synchronize a chaotic sequence with a digital input signal. The loop control circuit 320 is also configured to communicate the phase and frequency offset information to the quadrature digital local oscillator 322 portion of the IF translator and gain deviation compensation information to the automatic gain control (AGC) amplifier 308. The loop control circuit 320 is further configured to communicate a retiming control signal to the re-sampling filter 344 and the chaos generator 340.

As described above, the digital generation of the digital chaotic sequence at the transmitter 102 and receiver 104 is kept closely coordinated under the control of a precision real time reference 212, 336. The higher the precision of the references 212 and 336, the closer the synchronization of the chaos generator 218 of the transmitter 102 and the chaos generator 340 of the receiver 104 can be, excluding the effects of processing delay differences and channel propagation times.

Referring again to FIG. 3, the precision real time reference clock 336 is a stable local oscillator locked to a precision real time reference, such as a GPS clock receiver or a chip scale atomic clock (CSAC). The precision real time reference clock 336 is configured to supply a high frequency clock to the clocked logic circuits 314, . . . , 356 while being locked to a lower frequency reference clock. The lower frequency reference clock supplies a common reference and a common real time of day reference to prevent a large drift between the states of the chaos generator 218 and the chaos generator 340 of the receiver 104 over an extended time interval.

One of ordinary skill in the art will appreciate that the receiver 104 is an exemplary architecture of a communications system receiver. However, the invention is not limited in this regard and any other receiver architecture can be used without limitation. For example, if transmitter 102 is configured to transmit a signal 106 which is the combination of two or more modulated carriers, each associated with a set of data, as described above, receiver 104 can be configured to receive and demodulate the data in the modulated carriers. That is, components 314-352 can be configured to include two or more paths, each associated with one of the data sets in signal 106. As a result, each of said plurality of modulated carriers would be associated with at least one normalization factor value.

Amplitude Adjustment of a Chaotic Spread Spectrum Signal

Figure 4:
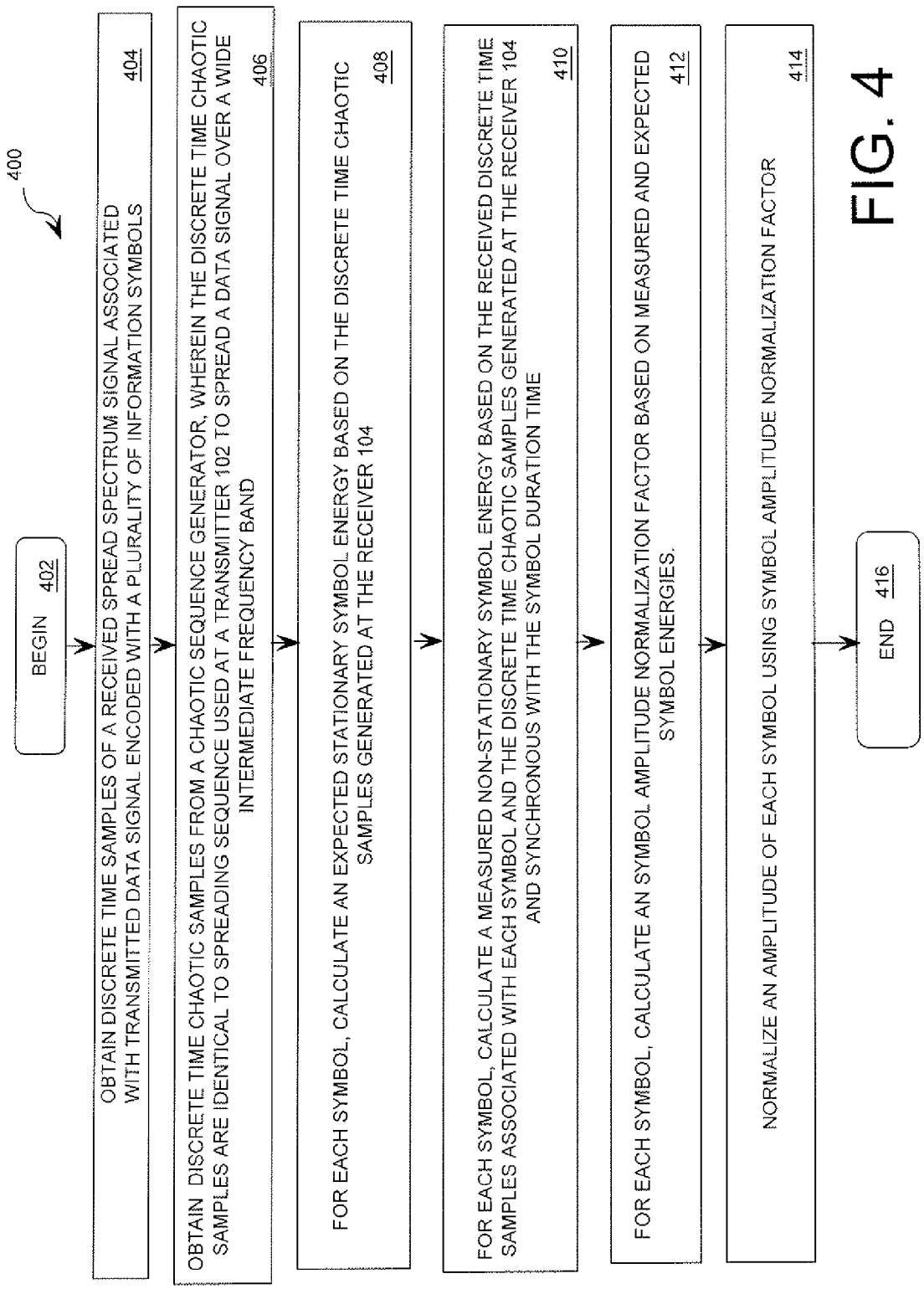
FIG. 4 is a flow diagram of a method for symbol estimation for symbols of a spread spectrum signal via implementation in a correlator design according to an embodiment of the invention.

Even though a received signal can be successfully correlated, the variations in amplitude of the signal generated by the correlator device 372 can result in soft symbol signals from the correlator device 372 with variations in amplitude that can result in the hard decision device 330 incorrectly identifying the symbol in the received signal. For example, as previously described, if a measured amplitude for a first symbol received at received 104 falls between the expected amplitude for the first symbol and the expected amplitude for a second symbol having a similar phase and within the decision window of the incorrect symbol due to a skewed amplitude, thus the hard decision device 330 would incorrectly decide that the received symbol was the second, rather than the first symbol. Accordingly, as described above, the signals from the correlator device 372 can be normalized by the SSND 374 to account for such variations, prior to providing the signals to the hard decision device 330. A method 400 for performing such an adjustment is shown in FIG. 4

Method 400 begins with step 402 and proceeds to step 404. In method 400, it is assumed that the correlator device 372 has already correlated and time-synchronized the received data signal with the chaotic sequence being generated at the receiver 104. Based on these synchronized signals, the method 400, in step 404, obtain the samples of the received signal associated with each symbol being output by the correlator device 372. That is, the measured sample values for the received signal, prior to de-spreading, are collected. Subsequently or in combination with step 404, the chip samples from the portion of the chaotic sequence associated with the symbol are also collected. That is, discrete-time chaotic samples of the chaotic sequence generated at the received 104 and used for de-spreading the symbol are collected. In other words, the chaotic samples collected are the same discrete-time chaotic samples used in transmitter 102 for spreading the data signal portion associated with the symbol.

After the samples from the received signal and the chaotic sequence are collected in steps 404 and 406, the measured and expected energies for the symbol can be calculated. First, in step 408, the expected symbol energy can be calculated from the chaotic samples collected in step 406. That is, the sum of the energy provided by each of the chaotic samples can be obtained in step 408. Since chaotic samples are effectively complex numbers, a real value of the expected or stationary symbol energy for each chaotic sample can be obtained by calculating the product of a chaotic sample value and its conjugate value. Accordingly step 408 also involves obtaining a conjugate value for each chaotic sample.

The measured or non-stationary symbol energy can be similarly obtained in step 410. That is, the samples of the received signal can be multiplied by the conjugate values of the associated chaotic samples. Since samples of the received signal are also effectively complex numbers and represent the same chaotic samples, albeit shifted in magnitude or phase, a value of the measured or non-stationary symbol energy for each sample of the received can be obtained using the conjugate value of the associated chaotic sample since both signals are associated with the same chaotic sequence. Accordingly step 410 can also involve obtaining a conjugate value for each associated chaotic sample. However, the invention is not limited in this regard and the conjugate values need not be separately calculated.

Once the expected and measured symbol energies are obtained in steps 408 and 410, a normalization factor can be calculated in step 412. The normalization factor can be used to adjust the amplitude of the signals from the correlation device 372 and effectively translate the nominal value of the received spread signal symbols to a point closer to the nominal value of the de-spread signal symbols. That is, the overall received signal power can be used to determine the amount of amplitude shift being observed in the received symbol and the amount of correction necessary. One such normalization process is to multiply the de-spread soft symbol by a scaled inverse of the total energy contained in the internally generated chaotic signal during the corresponding symbol interval. Accordingly, the normalization factor can be used to reduce the amplitude variance of the received symbols, reducing the likelihood of incorrect symbol decisions at the hard decision device 330 due to the non-stationary characteristic of the chaotic spreading sequence.

In some embodiments, the normalization factor can also include an additional compensation to ensure a constant signal strength variation for all symbols. That is, once the input data signal and the chaotic sequences are synchronized in time in the correlator 328, the expected overall energy difference between expected and received symbols in each would typically be a constant ratio over a period of time (at least over several symbol periods). Accordingly, the normalization factor can be further adjusted in step 412 to include that ratio value controlled by a second AGC loop configured to track long-term variation in symbol energy and adjust the normalization factor further to maintain the expected ratio. This long-term AGC is performed at a much slower rate, operating as is typical in spread spectrum communications receivers that employ stationary spreading sequences. Any traditional long-term AGC method may be used without limitation. Once the normalization factor is obtained in step 412, the normalization factor can be applied to the correlated and de-spread signal for the symbol in step 414. Afterwards, the method 400 can end. One of ordinary skill in the art will recognize that the method would be repeated for each symbol.

Generation of Chaotic Sequences

One aspect of the invention provides for digitally generating a chaotic sequence for spreading a channel encoded signal or for generating a sequence of symbol energy values. In this regard, it should be appreciated that the presence of any pattern in a chaotic sequence is much more difficult to identify as compared to patterns that emerge over time with a pseudo-random number sequence. As such, a chaotic sequence is characterized by a greater degree of apparent randomness as compared to a conventional pseudo-random number sequence.

Figure 5:
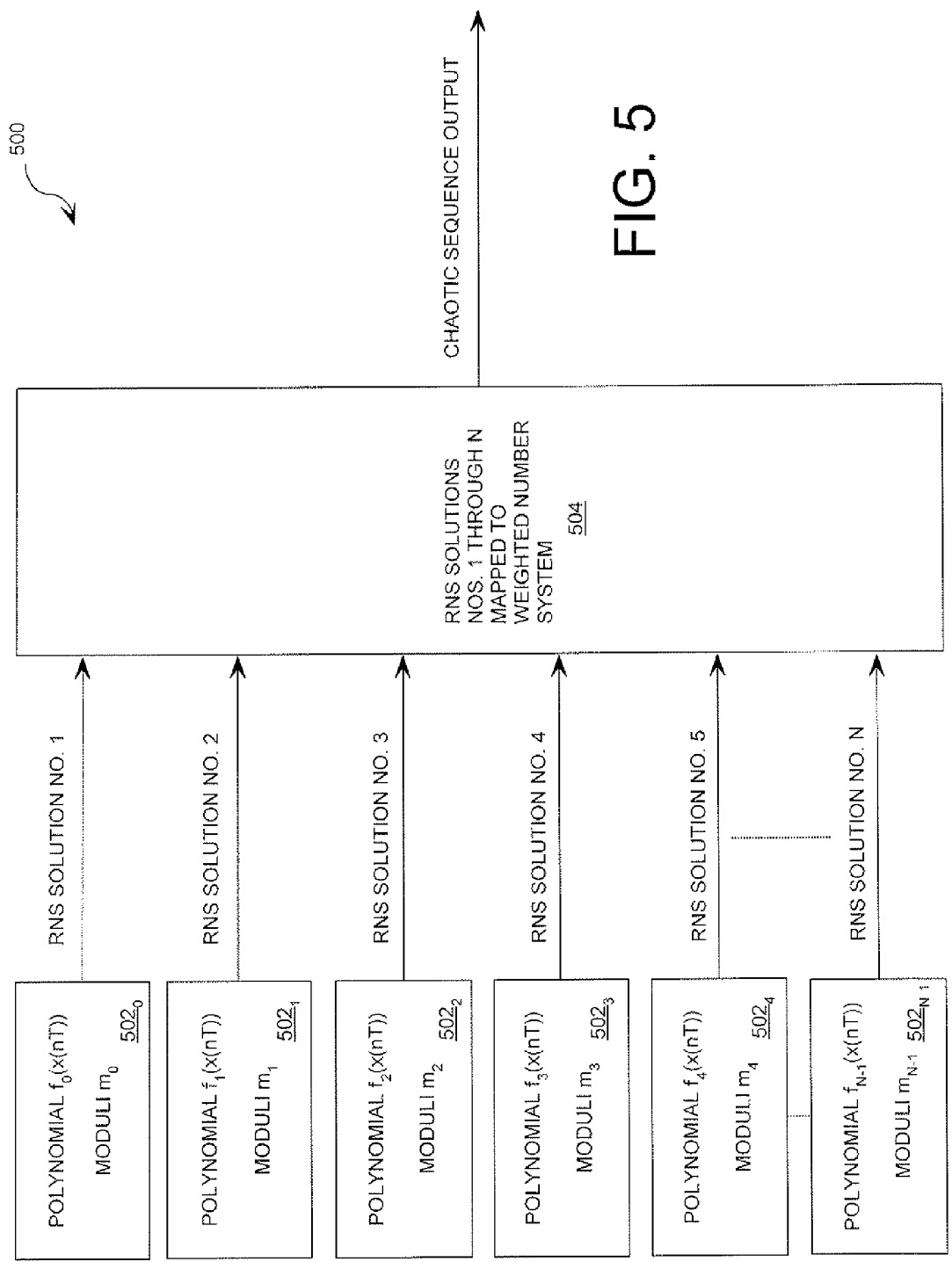
FIG. 5 is a conceptual diagram of a chaotic sequence generator in accordance with an embodiment of the invention.

Referring now to FIG. 5, there is provided a conceptual diagram of a chaotic sequence generator 500 in accordance with the various embodiments of the invention. As shown in FIG. 5, generation of the chaotic sequence begins at processing devices $502_0, \ldots, 502_{N-1}$ where N polynomial equations $f_0(x(nT)), \ldots, f_{N-1}(x(nT))$ are selected. The N polynomial equations $f_0(x(nT)), \ldots, f_{N-1}(x(nT))$ can be selected as the same polynomial equation or as different polynomial equations. According to an aspect of the invention, the N polynomial equations $f_0(x(nT)), \ldots, f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation" as used herein refers to a polynomial equation that cannot be expressed as a product of at least two nontrivial polynomial equations over the same Galois field. For example, the polynomial equation f(x(nT)) is irreducible if there does not exist two (2) non-constant polynomial equations g(x(nT)) and h(x(nT)) in x(nT) with rational coefficients such that f(x(nT))=g(x(nT))·h(x(nT)).

As will be understood by one of ordinary skill in the art, each of the N polynomial equations $f_0(x(nT)), \ldots, f_{N-1}(x(nT))$ can be solved independently to obtain a respective solution. Each solution can be expressed as a residue number system (RNS) residue value using RNS arithmetic operations, i.e. modulo operations. Modulo operations are well known to one of ordinary skill in the art. Thus, such operations will not be described in great detail herein. However, it should be appreciated that a RNS residue representation for some weighted value "a" can be defined by mathematical Equation (1).

$$R = \{a \text{ modulo } m_0, a \text{ modulo } m_1, \ldots, a \text{ modulo } m_{N-1}\} \quad (1)$$

where R is a RNS residue N-tuple value representing a weighted value "a". Further, R(nT) can be a representation of the RNS solution of a polynomial equation f(x(nT)) defined as $R(nT) = \{f_0(x(nT)) \text{ modulo } m_0, f_1(x(nT)) \text{ modulo } m_1, \ldots, f_{N-1}(x(nT)) \text{ modulo } m_{N-1}\}$. $m_0, m_1, \ldots, m_{N-1}$ respectively are the moduli for RNS arithmetic operations applicable to each polynomial equation $f_0(x(nT)), \ldots, f_{N-1}(x(nT))$.

From the foregoing, it will be appreciated that the RNS employed for solving each of the polynomial equations $f_0(x(nT)), \ldots, f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers" as used herein refers to a collection of natural numbers having no common divisors except one (1). Consequently, each RNS arithmetic operation employed for expressing a solution as an RNS residue value uses a different prime number $p_0, p_1, \ldots, p_{N-1}$ as a moduli $m_0, m_1, \ldots, m_{N-1}$.

Those of ordinary skill in the art will appreciate that the RNS residue value calculated as a solution to each one of the polynomial equations $f_0(x(nT)), \ldots, f_{N-1}(x(nT))$ will vary depending on the choice of prime numbers $p_0, p_1, \ldots, p_{N-1}$ selected as a moduli $m_0, m_1, \ldots, m_{N-1}$. Moreover, the range of values will depend on the choice of relatively prime numbers $p_0, p_1, \ldots, p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the N polynomial equations $f_0(x(nT)), \ldots, f_{N-1}(x(nT))$ is selected as an irreducible cubic polynomial equation having chaotic properties in Galois field arithmetic. Each of the N polynomial equations $f_0(x(nT)), \ldots, f_{N-1}(x(nT))$ can also be selected to be a constant or varying function of time. The irreducible cubic polynomial equation is defined by a mathematical Equation (2).

$$f(x(nT)) = Q(k)x^3(nT) + R(k)x^2(nT) + S(k)x(nT) + C(k,L) \quad (2)$$

where n is a sample time index value. k is a polynomial time index value. L is a constant component time index value. T is a fixed constant having a value representing a time increment. Q, R, and S are coefficients that define the polynomial equation f(x(nT)). C is a coefficient of x(nT) raised to a zero power and is therefore a constant for each polynomial characteristic. In one embodiment, a value of C is selected which empirically is determined to produce an irreducible form of the stated polynomial equation f(x(nT)) for a particular prime modulus. For a given polynomial with fixed values for Q, R, and S more than one value of C can exist, each providing a unique iterative sequence. Still, the invention is not limited in this regard.

According to another embodiment of the invention, the N polynomial equations $f_0(x(nT)) \ldots f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation $f(x(nT))$. Such constant values $C_0, C_1, \ldots, C_{N-1}$ and associated modulus $m_0, m_1, \ldots, m_{N-1}$ values which produce an irreducible form of the stated polynomial equation $f(x(nT))$ are listed in the following Table (1).

TABLE 1

| Moduli values $m_0, m_1, \ldots, m_{N-1}$: | Sets of constant values $C_0, C_1, \ldots, C_{N-1}$: |
|---|---|
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Still, the invention is not limited in this regard.

The number of discrete magnitude states (dynamic range) that can be generated with the system shown in FIG. 5 will depend on the quantity of polynomial equations N and the modulus values $m_0, m_1, \ldots, m_{N-1}$ values selected for the RNS number systems. In particular, this value can be calculated as the product $M=m_0 \cdot m_1 \cdot m_3 \cdot m_4 \cdot \ldots \cdot m_{N-1}$.

Referring again to FIG. 5, it should be appreciated that each of the RNS solutions Nos. 1 through N is expressed in a binary number system representation. As such, each of the RNS solutions Nos. 1 through N is a binary sequence of bits. Each bit of the sequence has a zero (0) value or a one (1) value. Each binary sequence has a bit length selected in accordance with a particular modulus.

According to an embodiment of the invention, each binary sequence representing a residue value has a bit length (BL) defined by a mathematical Equation (3).

$$BL=\text{Ceiling}[\text{Log } 2(m)] \tag{3}$$

where m is selected as one of moduli $m_0, m_1, \ldots, m_{N-1}$. Ceiling[u] refers to a next highest integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_1(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_3(x(nT))$ are in the range of zero (0) and four hundred sixty six (466) which can be represented in nine (9) binary digits. Possible solutions for $f_4(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), \ldots, f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3,563,762,191,059,523$. The binary number system representation of each RNS solution can be computed using Ceiling[Log 2(3,563,762,191,059,523)]=Ceiling[51.66]=52 bits. Because each polynomial is irreducible, all 3,563,762,191,059,523 possible values are computed resulting in a sequence repetition time of M times T seconds, i.e., a sequence repetition times an interval of time between the computation of each values in the sequence of generated values. Still, the invention is not limited in this regard.

Referring again to FIG. 5, the generation of a chaotic sequence continues with mapping operation performed by a mapping device 504. The mapping operations involve mapping the RNS solutions Nos. 1 through N to a weighted number system representation to form a chaotic sequence output. The phrase "weighted number system" as used herein refers to a number system other than a residue number system. Such weighted number systems include, but are not limited to, an integer number system, a binary number system, an octal number system, and a hexadecimal number system.

According to an aspect of the invention, the RNS solutions Nos. 1 through N are mapped to a weighted number system representation by determining a series of digits in the weighted number system based on the RNS solutions Nos. 1 through N. The term "digit" as used herein refers to a symbol of a combination of symbols to represent a number. For example, a digit can be a particular bit of a binary sequence. According to another aspect of the invention, the RNS solutions Nos. 1 through N are mapped to a weighted number system representation by identifying a number in the weighted number system that is defined by the RNS solutions Nos. 1 through N. According to yet another aspect of the invention, the RNS solutions Nos. 1 through N are mapped to a weighted number system representation by identifying a truncated portion of a number in the weighted number system that is defined by the RNS solutions Nos. 1 through N. The truncated portion can include any serially arranged set of digits of the number in the weighted number system. The truncated portion can also be exclusive of a most significant digit of the number in the weighted number system. The phrase "truncated portion" as used herein refers to a chaotic sequence with one or more digits removed from its beginning and/or ending. The phrase "truncated portion" also refers to a segment including a defined number of digits extracted from a chaotic sequence. The phrase "truncated portion" also refers to a result of a partial mapping of the RNS solutions Nos. 1 through N to a weighted number system representation.

According to an embodiment of the invention, a mixed-radix conversion method is used for mapping RNS solutions Nos. 1 through N to a weighted number system representation. "The mixed-radix conversion procedure to be described here can be implemented in" [modulo moduli only and not modulo the product of moduli.] *See Residue Arithmetic and Its Applications To Computer Technology*, written by Nicholas S. Szabo & Richard I. Tanaka, McGraw-Hill Book Co., New York, 12967. [In a mixed-radix number system,] "a number x may be expressed in a mixed-radix form:

$$x = a_N \prod_{i=1}^{N-1} R_i + \ldots + a_3 R_1 R_2 + a_2 R_1 + a_1$$

where the $R_i$ are the radices, the $a_i$ are the mixed-radix digits, and $0 \leq a_i < R_i$. For a given set of radices, the mixed-radix representation of x is denoted by $(a_n, a_{n-1}, \ldots, a_1)$ where the digits are listed order of decreasing significance." See Id. "The multipliers of the digits $a_i$ are the mixed-radix weights where the weight of $a_i$ is $$\prod_{j=1}^{i-1} R_j \text{ for } i \neq 1.\text{" See Id.}$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_i.$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1$$

where $a_i$ are the mixed-radix coefficients. The $a_i$ are determined sequentially in the following manner, starting with $a_1$." See Id.

$$x = a_N \prod_{i=1}^{N-1} m_i + \ldots + a_3 m_1 m_2 + a_2 m_1 + a_1$$

is first taken modulo $m_1$. "Since all terms except the last are multiples of $m_1$, we have $\langle x \rangle_{m_1} = a_1$. Hence, $a_1$ is just the first residue digit." See Id.

"To obtain $a_2$, one first forms $x-a_1$ in its residue code. The quantity $x-a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}.$$

Inspection of $$\left[ x = a_N \prod_{i=1}^{N-1} m_i + \ldots + a_3 m_1 m_2 + a_2 m_1 + a_1 \right]$$

shows then that x is $a_2$. In this way, by successive subtracting and dividing in residue notation, all of the mixed-radix digits may be obtained." See Id.

"It is interesting to note that $$a_1 = \langle x \rangle_{m_1},$$

$$a_2 = \left\langle \left\lfloor \frac{x}{m_1} \right\rfloor \right\rangle_{m_2},$$

$$a_3 = \left\langle \left\lfloor \frac{x}{m_1 m_2} \right\rfloor \right\rangle_{m_3}$$

and in general for $i > 1$ $$a_i = \left\langle \left\lfloor \frac{x}{m_1 m_2 \ldots m_{i-1}} \right\rfloor \right\rangle_{m_i}.\text{"}$$

See Id. From the preceding description it is seen that the mixed-radix conversion process is iterative. The conversion can be modified to yield a truncated result. Still, the invention is not limited in this regard.

In some embodiments of the invention, a Chinese remainder theorem (CRT) arithmetic operation is used to map the RNS solutions Nos. 1 through N to a weighted number system representation. The CRT arithmetic operation can be defined by a mathematical Equation (4).

$$Y(nT) = \left\{ \begin{array}{l} [\langle (3x_0^3(nT) + 3x_0^2(nT) + x_0(nT) + C_0)b_0\rangle_{p_0}] \frac{M}{p_0} + \ldots + \\ [\langle (3x_{N-1}^3(nT) + 3x_{N-1}^2(nT) + x_{N-1}(nT) + C_{N-1})b_{N-1}\rangle_{p_{N-1}}] \frac{M}{p_{N-1}} \end{array} \right\}_M \quad (4)$$

Mathematical Equation (4) can be re-written in iterative form as mathematical Equation (5).

$$Y(nT) = \left\{ \begin{array}{l} [\langle (3x_0^3((n-1)T) + 3x_0^2((n-1)T) + x_0((n-1)T) + C_0)b_0\rangle_{p_0}] \frac{M}{p_0} + \ldots + \\ [\langle (3x_{N-1}^3((n-1)T) + 3x_{N-1}^2((n-1)T) + x_{N-1}((n-1)T) + C_{N-1})b_{N-1}\rangle_{p_{N-1}}] \frac{M}{p_{N-1}} \end{array} \right\}_M \quad (5)$$

where $Y(nT)$ is the result of the CRT arithmetic operation. n is a sample time index value. T is a fixed constant having a value representing a time interval or increment. $x_0$-$x_{N-1}$ are RNS solutions Nos. 1 through N. $p_0, p_1, \ldots, p_{N-1}$ are prime number moduli. M is a fixed constant defined by a product of the relatively prime numbers $p_0, p_1, \ldots p_{N-1}$. $b_0, b_1, \ldots, b_{N-1}$ are fixed constants that are chosen as the multiplicative inverses of the product of all other primes modulo $p_0, p_1, \ldots, p_{N-1}$, respectively. Equivalently, $$b_j = \left(\frac{M}{p_j}\right)^{-1} \bmod p_j.$$

The $b_j$'s enable an isomorphic and equal mapping between an RNS N-tuple value representing a weighted number and said weighted number. However without loss of chaotic properties, the mapping need only be unique and isomorphic. As such, a weighted number x can map into a tuple y. The tuple y can map into a weighted number z. The weighted number x is not equal to x as long as all tuples map into unique values for z in a range from zero (0) to M−1. Thus for certain embodiments of the invention, the $b_j$'s can be defined as $$b_j = \left(\frac{M}{p_j}\right)^{-1} \bmod p_j.$$

In other embodiments of the invention, all $b_j$'s can be set equal to one or more values without loss of the chaotic properties. Different values of $b_j$ apply a bijective mapping within the RNS, but do not interfere with the CRT combination process.

The chaotic sequence output $Y(nT)$ can be expressed in a binary number system representation. As such, the chaotic sequence output $Y(nT)$ can be represented as a binary sequence. Each bit of the binary sequence has a zero (0) value or a one (1) value. The chaotic sequence output $Y(nT)$ can have a maximum bit length (MBL) defined by a mathematical Equation (6).

$$MBL = \text{Ceiling}[\text{Log } 2(M)] \quad (6)$$

where M is the product of the relatively prime numbers $p_0, p_1, p_{N-1}$ selected as moduli $m_0, m_1, \ldots, m_{N-1}$. In this regard, it should be appreciated the M represents a dynamic range of a CRT arithmetic operation. The phrase "dynamic range" as used herein refers to a maximum possible range of outcome values of a CRT arithmetic operation. Accordingly, the CRT arithmetic operation generates a chaotic numerical sequence with a periodicity equal to the inverse of the dynamic range M. The dynamic range requires a Ceiling[Log 2(M)] bit precision.

In some embodiments of the invention, M equals three quadrillion five hundred sixty-three trillion seven hundred sixty-two billion one hundred ninety-one million fifty-nine thousand five hundred twenty-three (3,563,762,191,059,523). By substituting the value of M into Equation (6), the bit length (BL) for a chaotic sequence output $Y(nT)$ expressed in a binary system representation can be calculated as follows: BL=Ceiling[Log 2(3,563,762,191,059,523)]=52 bits. As such, the chaotic sequence output $Y(nT)$ is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059,522), inclusive. Still, the invention is not limited in this regard. For example, the chaotic sequence output $Y(nT)$ can be a binary sequence representing a truncated portion of a value between zero (0) and M−1. In such a scenario, the chaotic sequence output $Y(nT)$ can have a bit length less than Ceiling[Log 2(M)]. It should be noted that while truncation affects the dynamic range of the system it has no effect on the periodicity of a generated sequence.

As one of ordinary skill in art will recognize, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical Equation (2) can be rewritten in a general iterative form: $f(x(nT)=Q(k)x^3((n-1)T)+R(k)x^2((n-1)T)+S(k)x((n-1)T)+C(k,L)$. For example, a fixed coefficient polynomial equation is selected as $f(x(n\cdot 1 \text{ ms}))=3x^3((n-1)\cdot 1 \text{ ms})+3x^2((n-1)\cdot 1 \text{ ms})+x((n-1)\cdot 1 \text{ ms})+8$ modulo 503. n is a variable having a value defined by an iteration being performed. x is a variable having a value allowable in a residue ring. In a first iteration, n equals one (1) and x is selected as two (2) which is allowable in a residue ring. By substituting the value of n and x into the stated polynomial equation $f(x(nT))$, a first solution having a value forty-six one (46) is obtained. In a second iteration, n is incremented by one and x equals the value of the first solution, i.e., forty-six (46) resulting in the solution 298, 410 mod 503 or one hundred thirty-one (131). In a third iteration, n is again incremented by one and x equals the value of the second solution.

Figure 6:
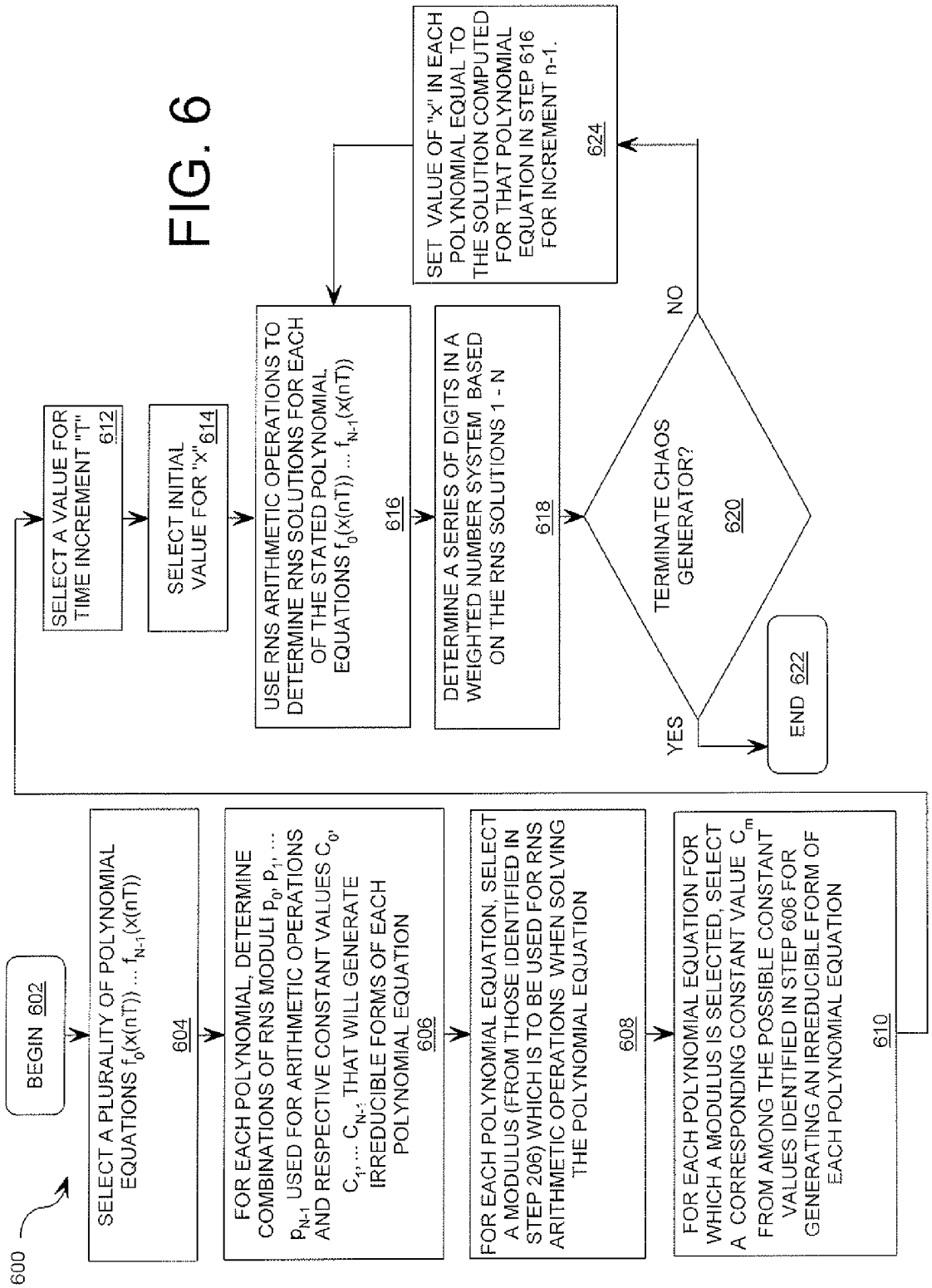
FIG. 6 is a flow diagram of an exemplary method for generating a chaotic sequence in accordance with an embodiment of the invention.

Referring now to FIG. 6, there is provided a flow diagram of an exemplary method 600 for generating a chaotic sequence according to an embodiment of the invention. As shown in FIG. 6, the method 600 begins with step 602 and continues with step 604. In step 604, a plurality of polynomial equations $f_0(x(nT)), \ldots, f_{N-1}(x(nT))$ are selected. In this regard, it should be appreciated that the polynomial equations $f_0(x(nT)), \ldots, f_{N-1}(x(nT))$ can be selected as the same polynomial equation except for a different constant term or different polynomial equations. After step 604, step 606 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 608, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. In this regard, it should be appreciated that the modulus is selected from the moduli identified in step 606. It should also be appreciated that a different modulus must be selected for each polynomial equation $f_0(x(nT)), \ldots, f_{N-1}(x(nT))$.

As shown in FIG. 6, the method 600 continues with step 610. In step 610, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 606 for generating an irreducible form of the respective polynomial equation $f_0(x(nT)), \ldots, f_{N-1}(x(nT))$.

After step 610, the method 600 continues with step 612. In step 612, a value for time increment "T" is selected. Thereafter, an initial value for "x" is selected. In this regard, it should be appreciated that the initial value for "x" can be any value allowable in a residue ring. Subsequently, step 616 is performed where RNS arithmetic operations are used to iteratively determine RNS solutions for each of the stated polynomial equations $f_0(x(nT)), \ldots, f_{N-1}(x(nT))$. In step 618, a series of digits in a weighted number system are determined based in the RNS solutions. This step can involve performing a mixed radix arithmetic operation or a CRT arithmetic operation using the RNS solutions to obtain a chaotic sequence output.

After step 618, the method 600 continues with a decision step 620. If a chaos generator is not terminated (220:NO), then step 624 is performed where a value of "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 616. Subsequently, the method 600 returns to step 616. If the chaos generator is terminated (220:YES), then step 622 is performed where the method 600 ends.

One of ordinary skill in the art will appreciate that the method 600 is only one exemplary method for generating a chaotic sequence. However, the invention is not limited in this regard and any other method for generating a chaotic sequence can be used without limitation.

Figure 7:
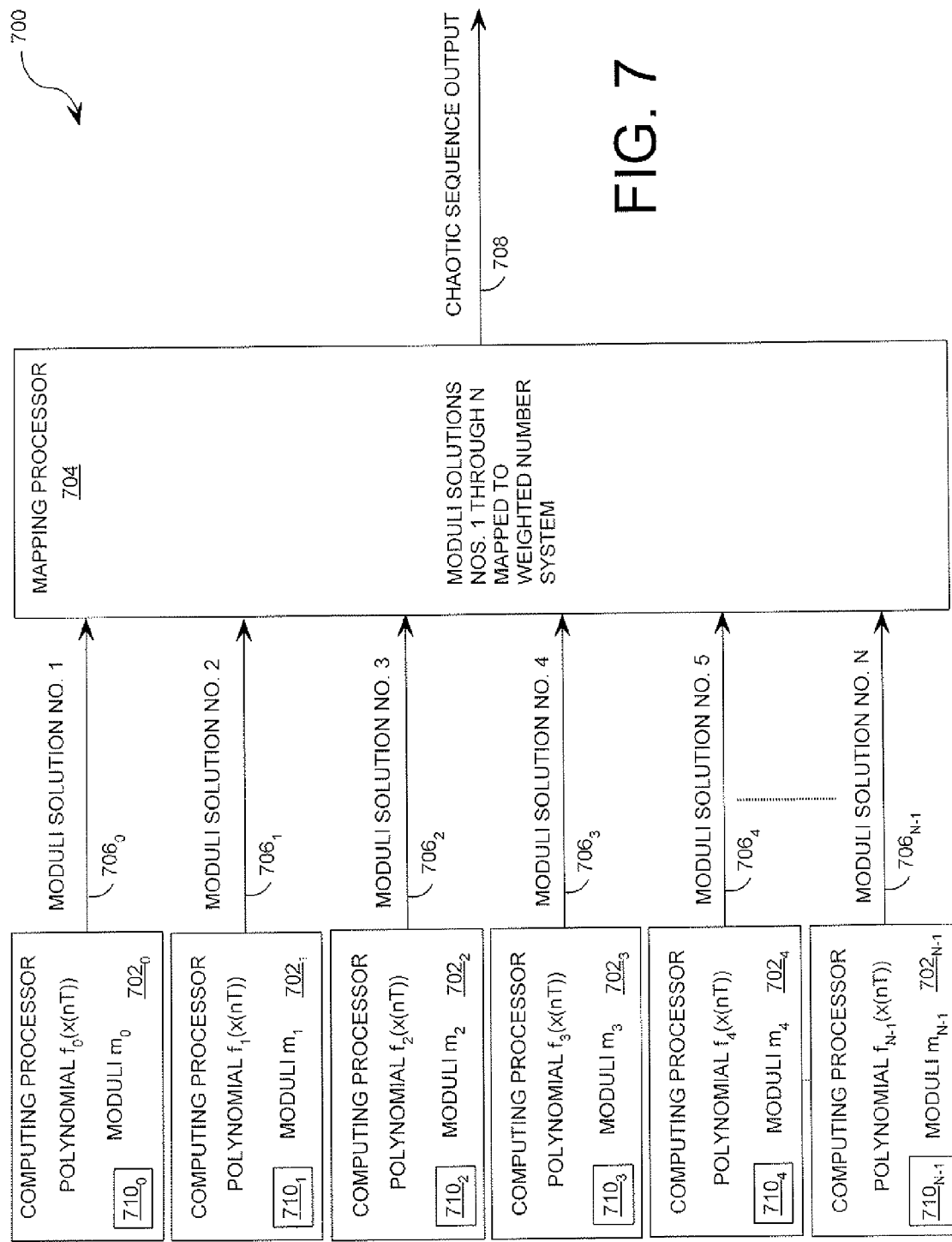
FIG. 7 is a block diagram of an exemplary chaotic sequence generator in accordance with an embodiment of the invention.

Referring now to FIG. 7, there is illustrated an exemplary chaotic sequence generator 700 in accordance with an embodiment of the invention. The chaotic sequence generator 700 is comprised of hardware and/or software configured to generate a digital chaotic sequence. In this regard, it should be appreciated that the chaotic sequence generator 700 is comprised of computing processors $702_0$-$702_{N-1}$. The chaotic sequence generator 700 is also comprised of a mapping processor 704. Each computing processor $702_0$-$702_{N-1}$ is coupled to the mapping processor 704 by a respective data bus $706_0$-$706_{N-1}$. As such, each computing processor $702_0$-$702_{N-1}$ is configured to communicate data to the mapping processor 704 via a respective data bus $706_0$-$706_{N-1}$. The mapping processor 704 can be coupled to an external device (not shown) via a data bus 708. In this regard, it should be appreciated that the external device (not shown) includes, but is not limited to, a communication device configured to combine or modify a signal in accordance with a chaotic sequence output.

Referring again to FIG. 7, the computing processors $702_0$-$702_{N-1}$ are comprised of hardware and/or software configured to solve N polynomial equations $f_0(x(nT)), \ldots, f_{N-1}(x(nT))$ to obtain a plurality of solutions. The N polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The N polynomial equations $f_0(x(nT)) \ldots fN_{-1}(x(nT))$ can also be identical exclusive of a constant value. The constant value can be selected so that a polynomial equation $f_0(x(nT)), \ldots, f_{N-1}(x(nT))$ is irreducible for a predefined modulus. The N polynomial equations $f_0(x(nT)), \ldots, f_{N-1}(x(nT))$ can further be selected as a constant or varying function of time.

Each of the solutions can be expressed as a unique residue number system (RNS) N-tuple representation. In this regard, it should be appreciated that the computing processors $702_0$-$702_{N-1}$ employ modulo operations to calculate a respective solution for each polynomial equation $f_0(x(nT)), \ldots, f_{N-1}(x(nT))$ using modulo based arithmetic operations. Each of the computing processors $702_0$-$702_{N-1}$ are comprised of hardware and/or software configured to utilize a different relatively prime number $p_0, p_1, \ldots, p_{N-1}$ as a moduli $m_0, m_1, \ldots, m_{N-1}$ for modulo based arithmetic operations. The computing processors $702_0$-$702_{N-1}$ are also comprised of hardware and/or software configured to utilize modulus $m_0, m_1, \ldots, m_{N-1}$ selected for each polynomial equation $f_0(x(nT)), \ldots, f_{N-1}(x(nT))$ so that each polynomial equation $f_0(x(nT)), \ldots, f_{N-1}(x(nT))$ is irreducible. The computing processors $702_0$-$702_{N-1}$ are further comprised of hardware and/or software configured to utilize moduli $m_0, m_1, \ldots, m_{N-1}$ selected for each polynomial equation $f_0(x(nT)), \ldots, f_{N-1}(x(nT))$ so that solutions iteratively computed via a feedback mechanism $710_0$-$710_{N-1}$ are chaotic. In this regard, it should be appreciated that the feedback mechanisms $710_0$-$710_{N-1}$ are provided so that the solutions for each polynomial equation $f_0(x(nT)), \ldots, f_{N-1}(x(nT))$ can be iteratively computed. Accordingly, the feedback mechanisms $710_0$-$710_{N-1}$ are comprised of hardware and/or software configured to selectively define a variable "x" of a polynomial equation as a solution computed in a previous iteration.

Referring again to FIG. 7, the computing processors $702_0$-$702_{N-1}$ are further comprised of hardware and/or software configured to express each of the RNS residue values in a binary number system representation. In this regard, the computing processors $702_0$-$702_{N-1}$ can employ an RNS-to-binary conversion method. Such methods are generally known to one of ordinary skill in the art and therefore will not be described in great detail herein. However, it should be appreciated that any such method can be used without limitation. It should also be appreciated that the residue values expressed in binary number system representations are hereinafter referred to as moduli solutions Nos. 1 through N comprising the elements of an RNS N-tuple.

According to an embodiment of the invention, the computing processors $702_0$-$702_{N-1}$ are further comprised of memory based tables (not shown) containing pre-computed residue values in a binary number system representation. The address space of each memory table is at least from zero (0) to mm for all m, $m_0$ through $m_{N-1}$. On each iteration, the table address is used to initiate the sequence. Still, the invention is not limited in this regard.

Referring again to FIG. 7, the mapping processor 704 is comprised of hardware and/or software configured to map the moduli (RNS N-tuple) solutions Nos. 1 through N to a weighted number system representation. The result is a series of digits in the weighted number system based on the moduli solutions Nos. 1 through N. For example, the mapping processor 704 can be comprised of hardware and/or software configured to determine the series of digits in the weighted number system based on the RNS residue values using a Chinese Remainder Theorem process. In this regard, it will be appreciated by one of ordinary skill in the art that the mapping processor 704 is comprised of hardware and/or software configured to identify a number in the weighted number system that is defined by the moduli solutions Nos. 1 through N.

In the various embodiments of the invention, the mapping processor 704 can be comprised of hardware and/or software configured to identify a truncated portion of a number in the weighted number system that is defined by the moduli solutions Nos. 1 through N. For example, the mapping processor 704 can also be comprised of hardware and/or software configured to select the truncated portion to include any serially arranged set of digits of the number in the weighted number system. Further, the mapping processor 704 can include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. Still, the invention is not limited in this regard.

Referring again to FIG. 7, the mapping processor 704 is comprised of hardware and/or software configured to express a chaotic sequence in a binary number system representation. In this regard, it should be appreciated that the mapping processor 704 can employ a weighted-to-binary conversion method. Such methods are generally known to one of ordinary skill in the art and therefore will not be described in great detail herein. However, it should be appreciated that any such method can be used without limitation.

One of ordinary skill in the art will appreciate that the chaotic receiver 104 shown in FIG. 3 is an exemplary architecture for a coherent chaotic receiver implementing the inventive soft symbol normalization process described herein. However, the invention is not limited in this regard, and any other chaotic communications receiver architecture can be used without limitation.

It should be recognized that the invention can be realized in hardware, software, or a combination of hardware and software. A method for decoding an encoded sequence according to the invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the invention in any way, except as set forth in the following claims.

All of the apparatus, methods and algorithms disclosed and claimed herein can be made and executed without undue experimentation in light of the present disclosure. While the invention has been described in terms of exemplary embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to one of ordinary skill in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for improving symbol estimation in a received data signal, comprising:

receiving an input data signal at said receiver, said input data signal comprising at least one modulated carrier encoded with a sequence of information symbols, said modulated carrier modulated using a sequence of discrete time chaotic samples generated at a transmitter, each of said discrete time chaotic samples having a shorter sample time interval than a duration of transmission of each of said plurality of information symbols;

generating a replica of said sequence of discrete-time chaotic samples at said receiver;

synchronizing said input data signal in time with said replica of said sequence of discrete-time chaotic samples generated at said receiver;

correlating said input data signal with said replica to generate a de-spread data signal comprising a plurality of soft symbols;

obtaining at least one normalization factor value for each of said soft symbols based on a result obtained from comparing a received symbol energy for each of said plurality of information symbols and a symbol energy of said discrete-time chaotic samples associated with said duration of transmission for each of said plurality of symbols; and using said normalization factor value to reduce an amplitude variance of said de-spread data signal so that a likelihood of incorrect hard symbol decisions due to non-stationary characteristics of a chaotic spreading sequence is reduced.

2. The method of claim 1, further comprising:

demodulating said input data signal using said sequence of discrete-time chaotic samples which has been synchronized with said input data signal; and adjusting said demodulated signal associated with each of said plurality of information symbols based on said obtained normalization factor value.

3. A method for improving symbol estimation in a received data signal, comprising:
- receiving an input data signal at said receiver, said input data signal comprising at least one modulated carrier encoded with a sequence of information symbols, said modulated carrier modulated using a sequence of discrete time chaotic samples generated at a transmitter, each of said discrete time chaotic samples having a shorter sample time interval than a duration of transmission of each of said plurality of information symbols;
- generating said sequence of discrete-time chaotic samples at said receiver;
- synchronizing said input data signal in time, phase, and frequency with said sequence of discrete-time chaotic samples generated at said receiver; and
- obtaining one or more normalization factor values for each of said plurality of information symbols based on comparing a received symbol energy for each of said plurality of information symbols and a symbol energy of said discrete-time chaotic samples associated with said duration of transmission for each of said plurality of symbols;
- wherein said obtaining further comprises:
  - for each of said plurality of information symbols, calculating a first sum of an energy provided by each discrete-time sample in said input data signal during said duration of transmission;
  - calculating a second sum of an energy provided by each of said discrete-time chaotic samples in said sequence generated at said receiver and synchronous with said duration of transmission; and
  - calculating said normalization factor based on said first sum and said second sum.

4. The method of claim 3, said obtaining further comprising:
- for each of said plurality of information symbols, evaluating said first and said second sums for two or more previously received ones of said plurality of information symbols;
- determining a gain adjustment value for each of said plurality of information symbols based on said evaluating;
- adjusting said normalization factor with said gain adjustment value.

5. The method of claim 1, wherein said input data signal comprises a plurality of modulated carriers combined at the transmitter, each of said plurality of modulated carriers associated with said normalization factor value.

6. The method of claim 1, wherein said generating further comprises:
- selecting a plurality of polynomial equations;
- using residue number system (RNS) arithmetic operations to respectively determine a plurality of solutions for said plurality of polynomial equations, said plurality of solutions iteratively computed and expressed as RNS residue values; and
- determining a series of digits in a weighted number system based on said plurality of RNS residue values.

7. A non-transitory computer-readable storage medium, having stored therein a computer program for improving symbol estimation in a receiver, the computer program comprising a plurality of code sections, the code sections executable by a computer for causing the computer to perform the steps of:
- digitizing an input data signal, said input data signal comprising a modulated carrier encoded with a sequence of information symbols, said carrier modulated using a sequence of discrete time chaotic samples generated at remote location, each of said discrete time chaotic samples having a shorter sample time interval than a duration of transmission of each of said plurality of information symbols;
- generating a replica of said sequence of discrete-time chaotic samples;
- synchronizing said digitized signal in time with said generated sequence of discrete-time chaotic samples generated;
- correlating said input data signal with said replica to generate a de-spread data signal comprising a plurality of soft symbols;
- obtaining at least one normalization factor value for each of said soft symbols based on a result obtained from comparing a received symbol energy for each of said plurality of information symbols and a symbol energy of said discrete-time chaotic samples associated with said duration of transmission for each of said plurality of symbols; and
- using said normalization factor value to reduce an amplitude variance of said de-spread data signal so that a likelihood of incorrect hard symbol decisions due to non-stationary characteristics of a chaotic spreading sequence is reduced.

8. The computer-readable storage medium of claim 7, further comprising code sections for performing the steps of:
- demodulating said digitized signal using said sequence of discrete-time chaotic samples which has been synchronized with said input data signal; and
- adjusting said demodulated signal associated with each of said plurality of information symbols based on said obtained normalization factor value.

9. A non-transitory computer-readable storage medium, having stored therein a computer program for improving symbol estimation in a receiver, the computer program comprising a plurality of code sections, the code sections executable by a computer for causing the computer to perform the steps of:
- digitizing an input data signal, said input data signal comprising a modulated carrier encoded with a sequence of information symbols, said carrier modulated using a sequence of discrete time chaotic samples generated at remote location, each of said discrete time chaotic samples having a shorter sample time interval than a duration of transmission of each of said plurality of information symbols;
- generating said sequence of discrete-time chaotic samples;
- synchronizing said digitized signal in time, phase, and frequency with said generated sequence of discrete-time chaotic samples generated;

obtaining one or more normalization factor values for each of said plurality of information symbols based on comparing a received symbol energy for each of said plurality of information symbols and a symbol energy of said discrete-time chaotic samples associated with said duration of transmission for each of said plurality of symbols;
- for each of said plurality of information symbols, calculating a first sum of an energy provided by each discrete-time sample in said digitized signal during said duration of transmission;
- calculating a second sum of an energy provided by each of said discrete-time chaotic samples in said generated sequence synchronous with said duration of transmission; and
- calculating said normalization factor based on said first sum and said second sum.

10. The computer-readable storage medium of claim 9, said obtaining further comprising:
for each of said plurality of information symbols, evaluating said first and said second sums for two or more previously received ones of said plurality of information symbols in said digitized signal;
determining a gain adjustment value for each of said plurality of information symbols based on said evaluating;
adjusting said normalization factor with said gain adjustment value.

11. The computer-readable storage medium of claim 7, wherein said input data signal comprises a plurality of modulated carriers combined at the transmitter, each of said plurality of modulated carriers associated with said normalization factor value.

12. The computer-readable storage medium of claim 7, wherein said generating further comprises:
selecting a plurality of polynomial equations;
using residue number system (RNS) arithmetic operations to respectively determine a plurality of solutions for said plurality of polynomial equations, said plurality of solutions iteratively computed and expressed as RNS residue values; and
determining a series of digits in a weighted number system based on said plurality of RNS residue values.

13. A communications system, comprising:
RF hardware configured to receive an input data signal, said input data signal comprising at least one modulated carrier encoded with a sequence of information symbols, said modulated carrier modulated using a sequence of discrete time chaotic samples generated at a transmitter, each of said discrete time chaotic samples having a shorter sample time interval than a duration of transmission of each of said plurality of information symbols;
a chaotic sequence generator configured to generate a replica of said sequence of discrete-time chaotic samples generated at said transmitter; and
a correlator configured to:
synchronize said input data signal in time with and said replica of said sequence of discrete-time chaotic samples;
correlating said input data signal with said replica to generate a de-spread data signal comprising a plurality of soft symbols;
obtaining at least one normalization factor value for each of said soft symbols based on a result obtained from comparing a received symbol energy for each of said plurality of information symbols and a symbol energy of said discrete-time chaotic samples associated with said duration of transmission for each of said plurality of symbols; and
using said normalization factor value to reduce an amplitude variance of said de-spread data signal so that a likelihood of incorrect hard symbol decisions due to non-stationary characteristics of a chaotic spreading sequence is reduced.

14. The system of claim 13, wherein said signal processing element is further configured for:
demodulating said input data signal using said sequence of discrete-time chaotic samples which has been synchronized with said input data signal; and
adjusting said demodulated signal associated with each of said plurality of information symbols based on said normalization factor value.

15. A communications system, comprising:
RF hardware configured for receiving a input data signal, said input data signal comprising at least one modulated carrier encoded with a sequence of information symbols, said modulated carrier modulated using a sequence of discrete time chaotic samples generated at a transmitter, each of said discrete time chaotic samples having a shorter sample time interval than a duration of transmission of each of said plurality of information symbols;
a chaotic sequence generator configured for generating a sequence of discrete-time chaotic samples identical to said sequence of discrete-time chaotic samples generated at said transmitter; and
a correlator configured for:
synchronizing said input data signal in time, phase, and frequency with and said identical sequence of discrete-time chaotic samples;
obtaining one or more normalization factor values for each of said plurality of information symbols based on comparing a received symbol energy for each of said plurality of information symbols and a symbol energy of said discrete-time chaotic samples associated with said duration of transmission for each of said plurality of symbols;
for each of said plurality of information symbols, calculating a first sum of an energy provided by each discrete-time sample in said input data signal during said duration of transmission;
calculating a second sum of an energy provided by each of said discrete-time chaotic samples in said sequence generated at said receiver and synchronous with said duration of transmission; and
calculating said normalization factor based on said first sum and said second sum.

16. The system of claim 15, wherein said correlator is further configured during said obtaining for:
for each of said plurality of information symbols, evaluating said first and said second sums for two or more previously received ones of said plurality of information symbols;
determining a gain adjustment value for each of said plurality of information symbols based on said evaluating;
adjusting said normalization factor with said gain adjustment value.

17. The method of claim 13, wherein said input data signal comprises a plurality of modulated carriers combined at the transmitter, each of said plurality of modulated carriers associated with said normalization factor value.

18. The system of claim 13, wherein said chaotic sequence generates said sequence of discrete-time chaotic samples by:
selecting a plurality of polynomial equations;
using residue number system (RNS) arithmetic operations to respectively determine a plurality of solutions for said plurality of polynomial equations, said plurality of solutions iteratively computed and expressed as RNS residue values; and
determining a series of digits in a weighted number system based on said plurality of RNS residue values.

* * * * *